(12) United States Patent
Jaeger

(10) Patent No.: US 7,342,586 B2
(45) Date of Patent: Mar. 11, 2008

(54) SYSTEM AND METHOD FOR CREATING AND PLAYING A TWEENING ANIMATION USING A GRAPHIC DIRECTIONAL INDICATOR

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 331 days.

(21) Appl. No.: 10/940,841

(22) Filed: Sep. 13, 2004

(65) Prior Publication Data

US 2006/0077206 A1    Apr. 13, 2006

(51) Int. Cl.
G06T 15/70 (2006.01)
G06T 13/00 (2006.01)
(52) U.S. Cl. ............... 345/473; 345/474; 345/475
(58) Field of Classification Search ......... 345/473–475
See application file for complete search history.

(56) References Cited

U.S. PATENT DOCUMENTS

| | | | | |
|---|---|---|---|---|
| 5,053,760 A | * | 10/1991 | Frasier et al. ............... 345/473 |
| 5,252,953 A | * | 10/1993 | Sandrew et al. ............ 345/473 |
| 5,854,634 A | * | 12/1998 | Kroitor ....................... 345/473 |
| 5,929,867 A | * | 7/1999 | Herbstman et al. ......... 345/474 |
| 5,963,664 A | * | 10/1999 | Kumar et al. ............... 382/154 |
| 5,966,141 A | * | 10/1999 | Ito et al. ..................... 345/473 |
| 5,999,194 A | * | 12/1999 | Brunelle ..................... 345/473 |
| 6,031,564 A | * | 2/2000 | Ma et al. ...................... 348/43 |
| 6,373,492 B1 | * | 4/2002 | Kroitor ....................... 345/473 |
| 6,577,315 B1 | * | 6/2003 | Kroitor ....................... 345/473 |
| 6,883,145 B2 | * | 4/2005 | Jaeger ........................ 715/767 |
| 6,907,073 B2 | * | 6/2005 | Sawhney et al. ...... 375/240.14 |
| 2001/0031003 A1 | * | 10/2001 | Sawhney et al. ...... 375/240.14 |
| 2001/0043738 A1 | * | 11/2001 | Sawhney et al. ........... 382/154 |
| 2002/0061131 A1 | * | 5/2002 | Sawhney et al. ........... 382/154 |
| 2003/0090487 A1 | * | 5/2003 | Dawson-Scully ........... 345/473 |

* cited by examiner

*Primary Examiner*—Ulka Chauhan
*Assistant Examiner*—Roberta Prendergast

(57) ABSTRACT

A system and method for creating and playing tweening animations allows a user to simply draw a graphic directional indicator, e.g., an arrow, in a computer environment to associate graphic objects with the graphic directional indicator and generate a tweening animation of at least one of the associated graphic objects. The tweening animation can be made to play automatically when the graphic directional indicator is activated or can be made to be controllable by a user-manipulable control device.

24 Claims, 20 Drawing Sheets

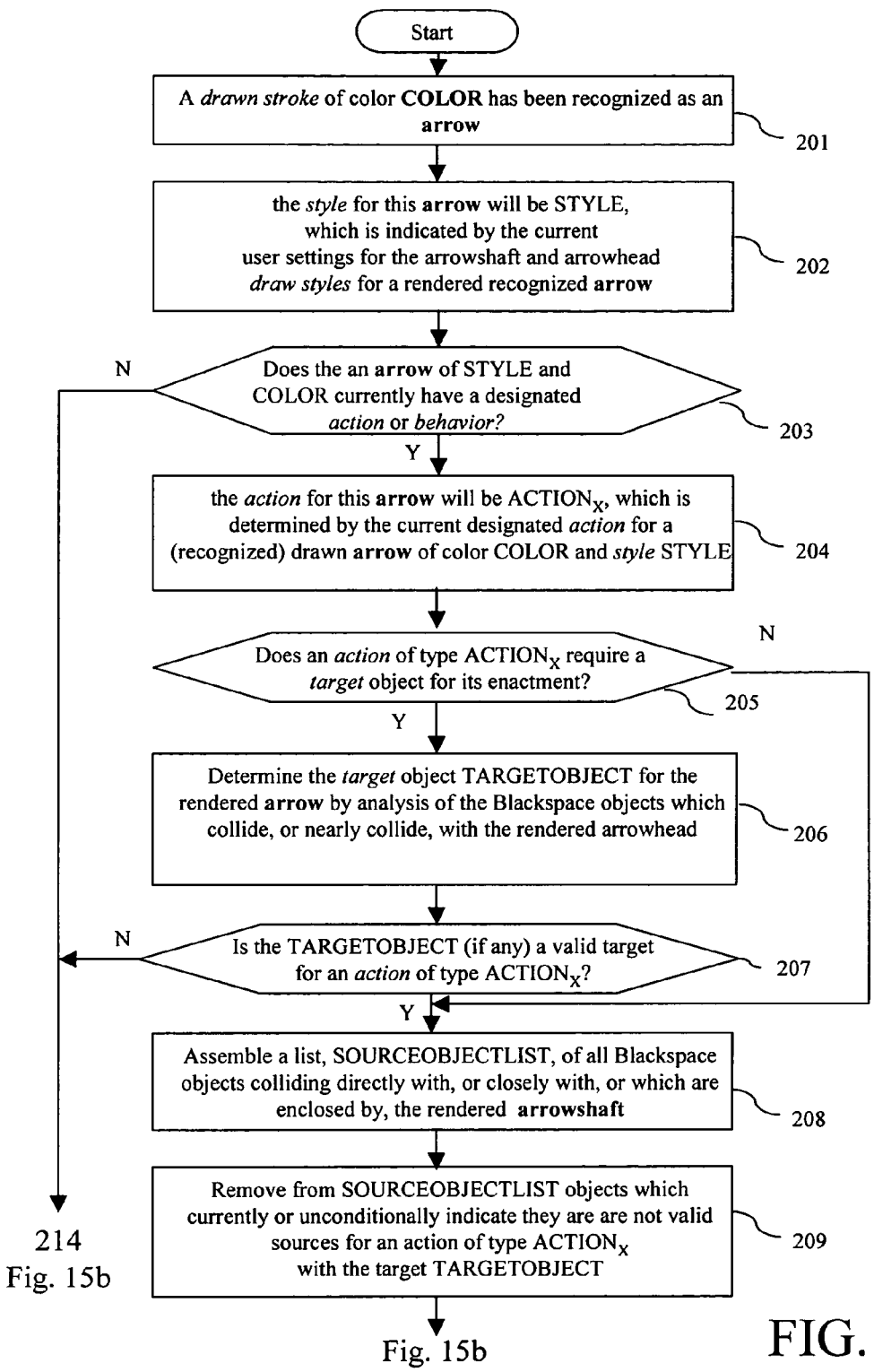

SYSTEM AND METHOD FOR CREATING AND PLAYING A TWEENING ANIMATION USING A GRAPHIC DIRECTIONAL INDICATOR

FIELD OF THE INVENTION

The invention relates generally to computer programs, and more particularly to a system and method for creating and playing tweening animations.

BACKGROUND OF THE INVENTION

"Tweening", which is short for "in-betweening", is an interpolation technique of generating intermediate frames between two frames to produce an animation in which the first frame changes smoothly to the second frame. Tweening can be used to create the appearance of motion for an image along a predefined path. Tweening can also be used to create the appearance of shape change of a first image into a second image. These effects can be combined to create a sophisticated animation, which can be inserted into, for example, electronic presentations and websites.

Conventional graphics programs with a tweening creation feature typically require a user to learn complex procedures using one or more "pull-down" menus. Each menu may include a number of multi-tiered command items. In general, these command items and their locations do not follow any objective standard or logic, except that of the program manufacturer. In some programs, the menu offerings change depending on the task or item that has been selected. Thus, remembering the exact locations of the required command items to create and play a tweening animation can be challenging to a novice user. Furthermore, the procedure for creating and playing a tweening animation using a conventional graphics program is usually so different from other procedures that in-depth knowledge of these other procedures does not provide significant advantage in learning how to create and play a tweening animation using the same graphics program.

In view of these concerns, what is needed is a system and method for creating and playing tweening animations that is more intuitive and simpler to use than conventional graphics programs.

SUMMARY OF THE INVENTION

A system and method for creating and playing tweening animations allows a user to simply draw a graphic directional indicator, e.g., an arrow, in a computer environment to associate graphic objects with the graphic directional indicator and generate a tweening animation of at least one of the associated graphic objects. The tweening animation can be made to play automatically when the graphic directional indicator is activated or can be made to be controllable by a user-manipulable control device.

A method for creating and playing tweening animations in accordance with an embodiment of the invention includes displaying graphic objects in a computer environment, drawing a graphic directional indicator in the computer environment, including associating the graphic objects with the graphic directional indicator, assigning a tweening function to the graphic directional indicator, and activating the tweening function of the graphic directional indictor in response to user input to generate a tweening animation of at least one of the associated graphic objects.

A system for creating and playing tweening animations in accordance with an embodiment of the invention includes a display device that can display graphic objects, including a graphic directional indicator, and a tweening module operatively coupled to the display device. The tweening module is configured to associate the graphic objects with the graphic directional indicator when the graphic directional indicator is drawn. The tweening module is further configured to assign a tweening function to the graphic directional indicator in response to user input. The tweening module is further configured to generate a tweening animation of at least one of the graphic objects when the graphic directional indicator is activated.

An embodiment of the invention includes a storage medium, readable by a computer, tangibly embodying a program of instructions executable by the computer to perform the method steps for creating and playing tweening animations.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 15a and 15b show a flowchart of a process for drawing arrows in Blackspace environment and applying and modifying an arrow logic in accordance with an embodiment of the invention.

DETAILED DESCRIPTION

Figure 1:
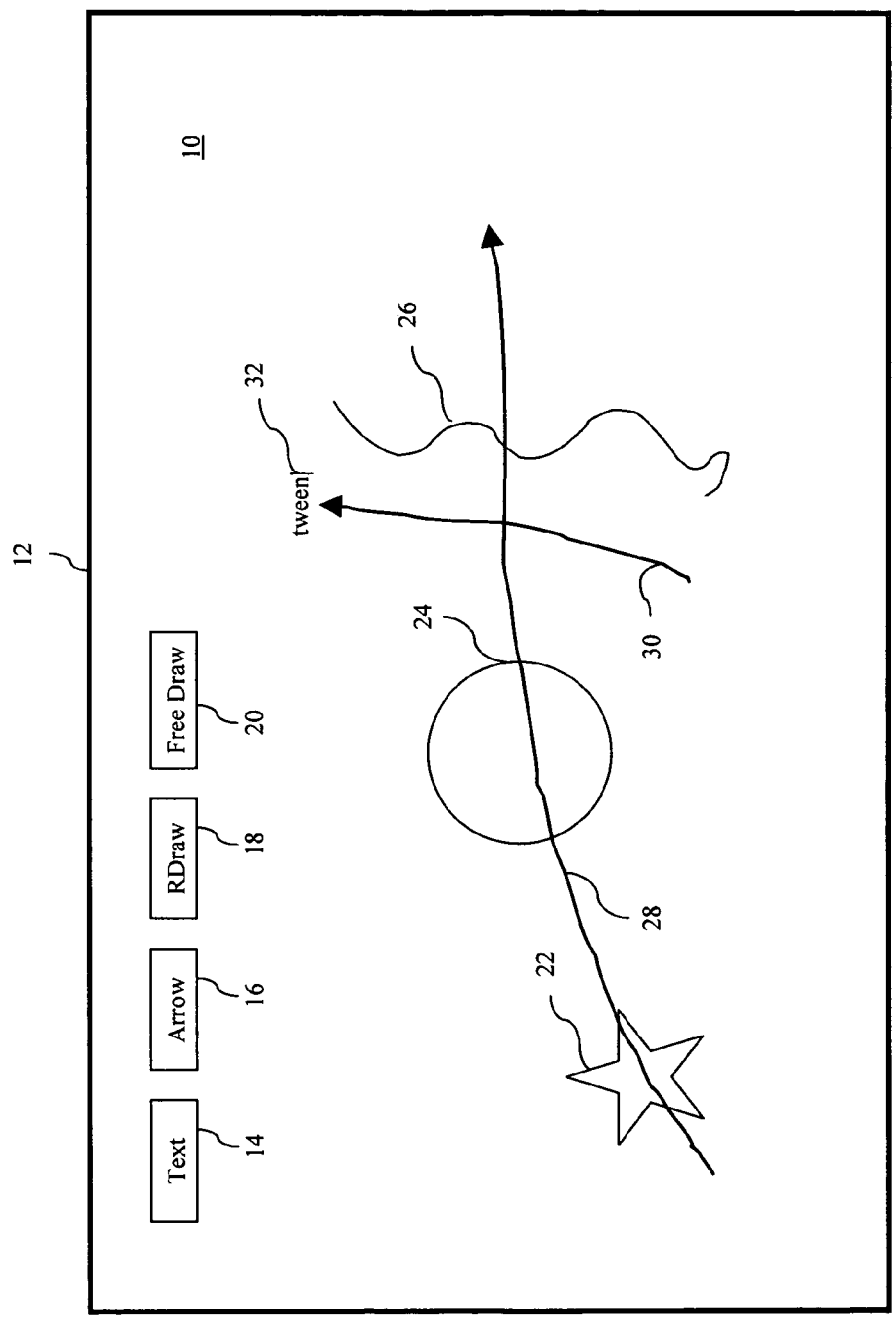
FIG. 1 shows how to create a tweening animation in accordance with an embodiment of the invention.

A system and method for creating and playing tweening animations in accordance with an embodiment of the invention allows a user to simply draw a graphic directional indicator, e.g., an arrow, in a computer environment to create a tweening animation of source objects displayed in the computer environment for the graphic directional indicator and its designated "arrow logic." The concept of arrow logic is described in detail below. A "source object" is any object that exists in the source object list of a drawn and recognized graphic directional indicator ("arrow") that has a designated arrow logic. These source objects may or may not be valid for a given arrow logic. Candidate graphic objects for a tweening animation are first "intersected" by drawing a graphic directional indicator through them, near them or around them. Then it is determined if any of these intersected objects can function as valid source objects for the "arrow logic" that is currently designated for the graphic directional indicator. In the case of a tween action, it would be a "control" logic.

If any of these intersected objects are valid source objects for this "control" logic, they remain in the source list of the graphic directional indicator. Then the order in which these objects were intersected by the graphic directional indicator is used as the order in which they are tweened in the resulting tweening animation. The source objects can be tweened at a stationary position, tweened along a path defined by one of the intersected graphic objects, or a path generated using common points, e.g., center points, of the intersected graphic objects. The tweening animation may be automatically played by activating the graphic directional indicator. Alternatively, the tweening animation can be manually manipulated using a user-manipulable control device, such as a graphic fader.

The system and method is described below with respect to a computer operating environment referred to herein as a "Blackspace" environment. However, the invention is not limited to the Blackspace environment and may be implemented in a different computer operating environment. The word "Blackspace" is a trademark of the NBOR Corporation. The Blackspace environment presents one universal drawing surface that is shared by all graphic objects within the environment. The Blackspace environment is analogous to a giant drawing "canvas" on which all graphic objects generated in the environment exist and can be applied. Thus, the Blackspace environment is sometimes referred to herein as the Blackspace surface. Each of these graphic objects can have a user-created relationship to any or all the other objects. There are no barriers between any of the objects that are created for or exist on this canvas. User can create objects with various functionalities without delineating sections of screen space. User can draw between any area of the screen freely to accomplish the following:

A. Perform the functionality of certain tasks and/or user-designed tasks (which can be represented as objects) within the same environment, e.g., the global drawing surface.

B. Draw between any objects on the screen regardless of what types of objects they are and whether they have similar or differing functionality.

C. Utilize the drawing of objects with assigned behavior (s) to designate, modify or exchange data and functionality between these tasks and other data without the need to reassign cursor behavior or other behaviors according to screen areas.

D. To modify the behavior of an existing graphic directional indicator ("arrow") and its "arrow logic."

In prior art, like drag and drop operations, the behavior and functionality of the cursor change according to its position on the screen. For example, the cursor may indicate that a certain operation cannot be performed and therefore changes its appearance to a circle with a bar through it. Another example would be the cursor changing into a hand indicating that something being hovered over can be moved. Alternately, moving the cursor into a highlighted region around a selected object will enable that object to be resized.

In a Blackspace environment this is not necessary, because functional behaviors are assigned to objects, not to regions of screen space. When drawing an object, e.g., an arrow, the cursor's behavior and appearance do not change wherever the user moves the cursor after the drawing operation has been started. The drawing may be continued and moved anywhere in the Blackspace environment. The behavior is assigned to the object, in this case the arrow, not to screen space. This behavior is applied then to other objects that are intersected or nearly intersected by the drawn arrow. Furthermore, the behavior assigned to the arrow also determines the manner in which other objects are designated by the drawing of the arrow. Finally, when the arrow is recognized and one or more objects are designated by its intersecting or nearly intersecting them or encircling them, then the arrow changes its appearance. The user can then opt to click on the arrow's arrowhead, for instance, to apply its behavior (arrow logic) to its designated objects. Once the arrow's behavior has been applied (after the user clicks on it arrowhead for instance), the arrow disappears. It's function being finished. It has no reason to exist onscreen any longer.

There are various approaches to using arrow logics. One approach is that when an arrow is drawn onscreen, an arrowlogic (which could be a software object) is created which can contain a list of objects which the arrow tail intersects or encloses. These are referred to as the source objects. The arrowlogic also contains the object(s) to which the arrow points. This is referred to as the target object(s). The function or behavior of the arrowlogic can be determined by the color and/or style (dashed, dotted, slotted, etc.) of the line used to draw the original graphical arrow.

Another approach would be that when an arrow is drawn onscreen, the software looks at the arrow logic which has been designated for the color and/or line style of the line that was used to draw that arrow. Furthermore, the software looks at the objects that the drawn arrow's shaft and arrowhead intersect, nearly intersect and/or encircle. The software then analyzes the type of arrow logic, the type and status of each source and target object for this drawn arrow with a designated arrow logic. A determination is made as to which objects are to be source objects and which objects are to be target objects. A further determination is made as to which source objects are valid for the type of arrow logic designated for the drawn arrow. A further determination is made as to which target objects are valid for the type of arrow logic designated for the drawn arrow. If at least one source object is valid for this arrow logic and the arrow logic supports just one source object, then a determination is made as to whether the arrow logic requires a target object. If this is the case, then a determination is made as to whether there is a valid target object for that arrow logic. If these conditions are successfully met, then the arrow logic is deemed to be valid. If not, then the arrow logic is deemed to be invalid. These events do not need to be accomplished in this exact order. For more information, see simultaneously filed U.S. patent application Ser. No. 10/940,507 entitled "Method for Creating User-Defined Computer Operations Using Arrows," which is incorporated herein by reference.

The creation of an object which encapsulates the methods and conditions for determining whether an arrow logic is valid is just one way of implementing the analysis of a drawn arrow with a designated arrow logic and its source and target objects. Other methods are possible that do not required the creation of an arrow logic object. For example, the source and target objects and the color and style of the drawn arrow (with a designated arrow logic) are analyzed dynamically by the software, without the need to create an encapsulating object for this analysis.

When the drawing recognition software recognizes that an arrow has been drawn, the source and target objects are calculated from the coordinates of the line which was drawn by the user. If these source and target objects, together with the line color, constitute a valid combination for further processing, the head of the first drawn arrow is turned white, indicating to the user that clicking on the arrowhead will cause some action to take place. This action is carried out by the arrowlogic object or its equivalent which is also created at this time.

Normally when the user "activates" an arrowlogic by clicking on the arrowhead of the arrow drawn to intersect various source and/or target objects, the graphical arrow is removed from the screen and the arrowlogic performs its designated task.

The action and/or behavior of an arrowlogic can be altered by the use of modifier arrows. These are arrows drawn by the user which intersect an arrow which has already been drawn (first drawn arrow), and remains visible on screen. This can be before the user has "activated" the arrowlogic. In such a situation the user is offered the option to add some text, either as a label on a switch, or by directly typing onto the screen (global drawing surface), in order to specify how the user wants the arrowlogic behavior to be modified.

If the user types some text at this point which is recognized as valid by the arrowlogic, then the modifier arrow's arrowhead is also turned white.

When the user clicks on a white arrowhead, the action determined by the valid arrow logic is executed. The operations carried out as a result of this action will depend on all the conditions that have been calculated during arrow recognition and analysis of its source and target objects. A point to note is that any operation set in motion here can access the list of modifier text items (or "modifiers") and the position that the modifier arrows occupy in relation to the list of source objects in the arrowlogic. In other words, the order that the source objects were intersected by the first drawn arrow with a designated arrow logic.

For example, suppose a red arrow, with a designated "control" logic, is drawn through three objects and is pointing to a fourth object. Further, suppose that a modifier arrow has intersected this first drawn arrow and the text "tween" has been typed for this modifier arrow. This text "tween" changes the behavior of the first draw arrow's action. In other words, the arrow is not just a basic control arrow any more. It has a modified action which causes the source object(s) that it intersects to change shape from one to the other in the order that they were intersected by the first drawn arrow. The time for the change of shape between each source object can be controlled by a software default, i.e., 1000 ms, or it can be user-defined. To accomplish this, after the first "tween" modifier arrow has been drawn, another modifier arrow is drawn to intersect the first drawn arrow between two of its objects, e.g., the second and third objects. Then the text "150 ms" can be typed for this modifier arrow. In this example, the arrow logic belonging to the first drawn arrow would have two entries in its list of modifiers—one specifying a modifying behavior "tween," to modify the basic arrow logic of the first drawn arrow and another specifying that the tween action is to be further modified to cause a change of shape between the second and third objects over a time period of 150 ms.

As used herein, the term "objects" include recognized graphic objects (e.g., stars, squares, circles, arrows, etc.), free drawn objects (sketches, drawings, lines, etc.), pictures in various file format (.png, .jpg, .bmp, .gif, etc.), graphic control devices (switches, faders, knobs, joysticks, etc.), videos in various file format (.mpg, .avi, .mov, etc.), text, and other graphic objects that are displayed on a display device.

An exemplary process for creating and playing a tweening animation using the system and method in accordance with an embodiment of the invention is described with reference to FIG. 1. In FIG. 1, a Blackspace environment 10 displayed in a display device 12 of a computer system is shown. The Blackspace environment 10 is shown to include a text switch 14, an arrow switch 16, a recognize draw ("RDraw") switch 18 and a free draw switch 20. These switches 14-20 are control devices that can be turned on to activate certain features of the Blackspace environment 10. The text switch 14 activates the text feature, which enables a user to enter text into the Blackspace environment 10. The arrow switch 16 activates the arrow recognition feature, which enables the computer program that provides the Blackspace environment 10 to recognize an arrow drawn by a user. Similar to the arrow switch 16, the recognize draw switch 18 activates the drawing recognition feature, which enables the Blackspace program to recognize hand drawn objects as predefined graphic objects, such as circles, stars and rectangles. The free draw switch 20 activates the free draw feature, which enables a user to freely draw anything in the Blackspace environment 10. Although not shown, the Blackspace environment 10 may include additional switches that activate other features of the environment. In the Blackspace environment 10, the user has full control of the number and type of switches displayed, as well as the positions of the displayed switches.

As shown in FIG. 1, the Blackspace environment 10 further includes displayed graphic objects, a star 22, a circle 24 and a line 26. The star 22 can be created by activating the recognize draw switch 18 and then free drawing a star, which when completed will automatically be recognized by the Blackspace program as a star and be redrawn as a computer generated star that replaces the hand drawn star. Similarly, the circle 24 can be created by activating the recognize draw switch 18 and then free drawing a circle, which will also be recognized by the Blackspace program as a circle and be redrawn as a computer generated circle. The line 26 can be created by activating the free draw switch 20 and then free drawing the line.

If a user wants to create and play a tweening animation in which the star 22 changes to the circle 24 and then changes to the line 26, the user draws an arrow 28 of a specific color (e.g., a red arrow) that intersects or contacts the star, the circle and the line and points to a blank area of the Blackspace environment 10. The software determines if any of the intersected objects are valid source objects for the "tween" logic. If they are, they remain in the source list of the graphic directional indicator. Determinations of what gets placed into the source list include, the type of arrow logic for the graphic directional indicator ("arrow"), the type of objects that are intersected by it, the types of behavior that is modifying the graphic directional indicator, and the types of behavior and/or properties that pertain the objects intersected by the graphic directional indicator. The arrow 28 has an arrow logic designated for it (which can be a default logic applied by the software). In this example, a "control logic." The star 22, the circle 24 and the line 26 can also be entered into consideration as valid source objects for the graphic directional indicator by drawing the arrow 28 such that the shaft of the arrow substantially encircles these objects. Alternative, the arrow 28 can be drawn to intersect or contact some of the objects and substantially encircle some of the objects to result in these objects being considered as valid source objects for the graphic directional indicator. The drawing of the red arrow 28 initiates an arrow logic of "control". This arrow logic is recalled by selecting a color that corresponds to that arrow logic. For more information regarding arrow logics, see simultaneously filed U.S. patent application Ser. No. 10/940,507 entitled "Method for Creating User-Defined Computer Operations Using Arrows", pending U.S. patent application Ser. No. 09/880,397 entitled "Arrow Logic System for Creating and Operating Control Systems", filed on Jun. 12, 2001, and pending U.S. patent application Ser. No. 09/785,049 entitled "Method for Creating and Operating Control Systems", filed on Feb. 15, 2001, which are all incorporated herein by reference.

A graphic object to which an arrow is pointed is treated as a "target" of the arrow, and a graphic object that is intersected by the shaft of the arrow is treated a "source" of the arrow. In FIG. 1, the arrow 28 is drawn such that the star 22, the circle 24 and the line 26 are intersected or contacted by the shaft of the arrow and the arrowhead points to the blank Blackspace surface 10. Thus, the Blackspace surface 10 is the target of the arrow 28 and the star 22, the circle 24 and the line 26 are the sources of the arrow. Note: In the case of using a control logic for tweening, no target object is required. So by typing "tween" (32) at the tip of the modifier arrow, the need for a target object for a control arrow logic is removed and the tip of the red control arrow can point to blank Blackspace surface and still create a valid arrow logic. Without the context of "tween," (or its equivalent), a control arrow logic would need to have an acceptable target object in order to become implemented as a valid logic. When a modifier arrow is drawn to intersect the shaft of the first drawn red arrow, with a control logic designated for it, the modifier arrow modifies the behavior of the control logic in various ways. Two of these ways are as follows. First, the strict control logic is changed to become a "tween" logic. Second, the need for a target object is removed and the tip of the first drawn arrow can point to blank Blackspace surface and create a valid "tween" logic.

The arrow 28 can be drawn by selecting a color from a graphic inkwell (not shown), turning on the arrow switch 16, and then drawing the arrow by left-clicking on a computer mouse when the cursor is at a first desired location and dragging the cursor to a second desired location and pulling back to create at least a half arrowhead. The first desired location coincides with the shaft end of the arrow 28, while the second desired location coincides with the tip of the arrowhead of the arrow.

When the arrow 28 is recognized as an arrow with an arrow logic, a graphic indication of this state is displayed. As an example, the arrowhead of the arrow 28 may turn white or it could pulsate, change shape or present some other suitable visual indication that that arrow logic is valid and is ready for implementation. The intersecting or contacting of the star 22, the circle 24 and the line 26 with the arrow 28 enters these objects into a source list for the graphic directional indicator. If any of these objects are found to be valid source objects for the arrow logic of the graphic directional indicator, these graphic objects will become available for a tweening animation. The order in which the graphic objects are intersected using the arrow 28 is significant since this order is used in the resulting tweening animation. Consequently, in the resulting tweening animation, the tweening change will be from the star 22 to the circle 24, and then to the line 26. If the intersection had been in reverse, the tweening change in the resulting tweening animation will be from the line 26 to the circle 24, and then to the star 22.

After the arrow 28 is recognized, a second arrow 30 of a particular color, e.g., red, which is referred to herein as a "modifier arrow", is drawn that intersects or contacts any part of the first arrow 28 and points to the Blackspace surface 10. The second arrow 30 is drawn in the same manner as the first arrow 28. The modifier arrow 30 is used to modify the arrow logic of the first arrow 28. When the second arrow 30 is recognized as a modifier arrow, a graphic indication of this state is displayed. As an example, the arrowhead of the second arrow 30 may turn white. When the modifier arrow 30 is recognized, a text cursor 32 will appear near the arrowhead of the modifier arrow so that the user can enter text and/or symbol(s) that represents the desired arrow modifier behavior to assign to the first drawn arrow 28 and thus modify the first drawn arrow's arrow logic. As an example, the user may enter "tween" to assign a tweening behavior or functionality to the first arrow 28 and accordingly modify its existing control logic. The exact position of the text cursor 32, and consequently, the entered text and/or symbol(s) can be located anywhere in the Blackspace environment 10, although an appropriate position is near the modifier arrow 30, e.g., near the head of the arrow 30.

Regarding modifier arrows, in general, a modifier arrow drawn in any color will have the same effect for a first drawn and recognized arrow having a designated arrow logic—in the case of the example above, a "control" logic. So a modifier arrow drawn in any color can yield the same result, namely, a text cursor appearing onscreen permitting a user to type a modifier behavior as a word, phrase or sentence, etc. This modifier arrow behavior will then modify the logic of the arrow that it intersects. In this case of this example, the modifier arrow and its typed behavior is modifying the "control" function to become a "tween" function. Alternately, modifier functions can be designated (assigned to) different colors, e.g., "tween" can be assigned to the color magenta and "copy" can be assigned to the color green, etc. Then, if a user draws a magenta arrow to intersect a red control arrow, no text cursor would appear for the modifier arrow. Instead, the behavior "tween" would automatically modify the "control" logic of the intersected arrow. In this context, it can be further determined in software that drawing a modifier arrow that matches the color of a first drawn arrow, with its designated logic, will cause a text cursor to appear onscreen, whereby a user can type text to equal a modifying behavior for the arrow logic of the arrow intersected by the modifier arrow.

Figure 2:
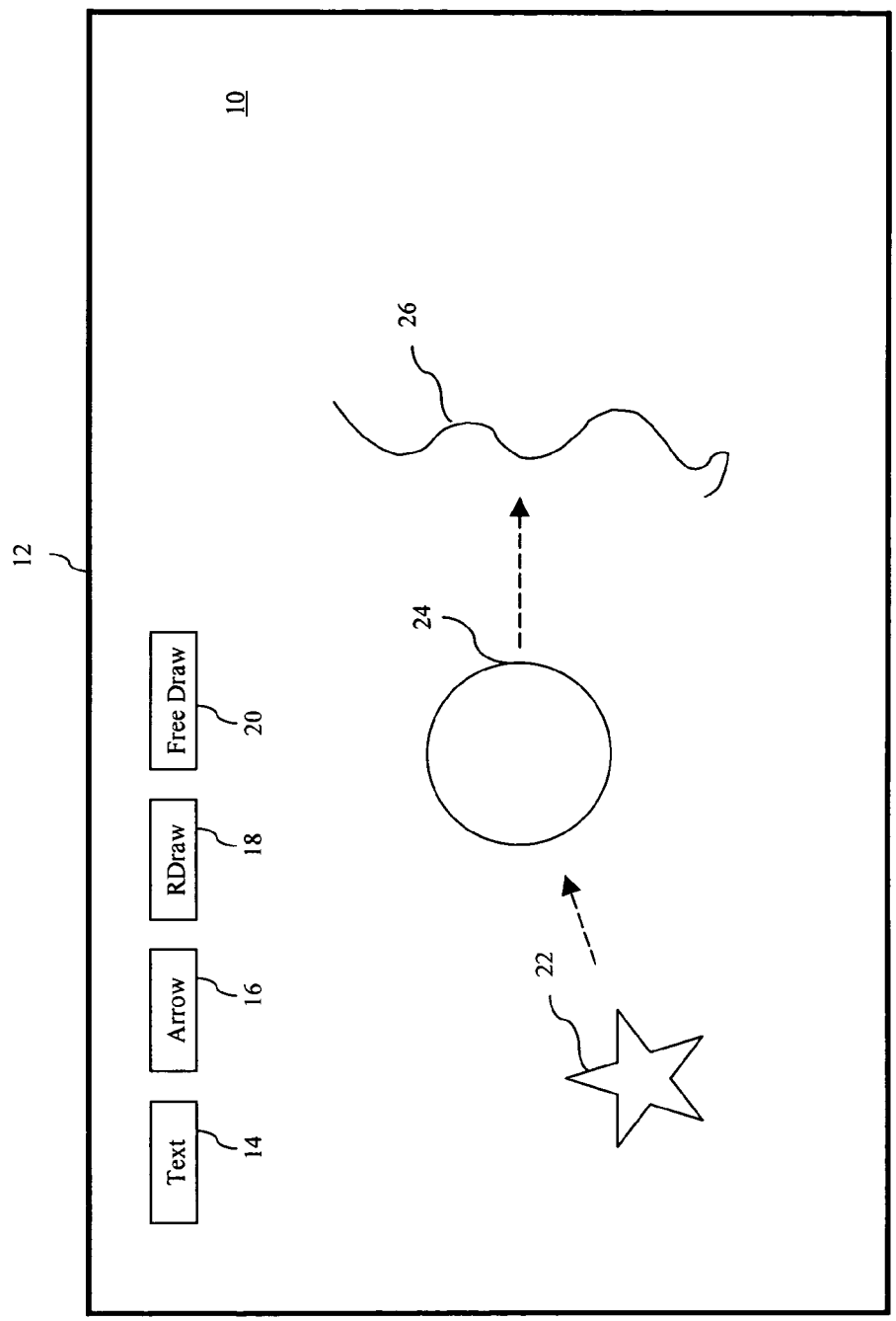
FIG. 2 illustrates the playing of a tweening animating that is created in accordance with an embodiment of the invention.

When the first arrow 28 or the modifier arrow 30 is activated, e.g., by a left mouse click on the arrowhead of one of the arrows, a tweening animation of the source objects, i.e., the star, the circle and the line, is created and automatically played in the Blackspace environment 10. The tweening animation begins to play by displaying the star 22 at its original position, as shown in FIG. 2. After a predefined period, the star 22 changes into the circle 24 while moving toward the original position of the circle. When the star 22 is completely changed into the circle 24, the circle is displayed at its original position, as illustrated in FIG. 2. The circle 24 then changes into the line 26 while moving toward the original position of the line. When the circle 24 is completely changed into the line 26, the line is displayed at its original position. The line 26 remains displayed at its original position for a predefined period and then disappears, which is the end of the tweening animation.

Thus, in this example, the path for the motion of the shapes in the tweening animation includes a path segment from the original position of the star 22 to the original position of the circle 24 and a path segment from the original position of the circle to the original position of the line 26. Each path segment is defined as a straight line between the predefined points, e.g., the center points, of two graphic objects that were consecutively intersected by the drawing of the arrow 28.

Figure 3:
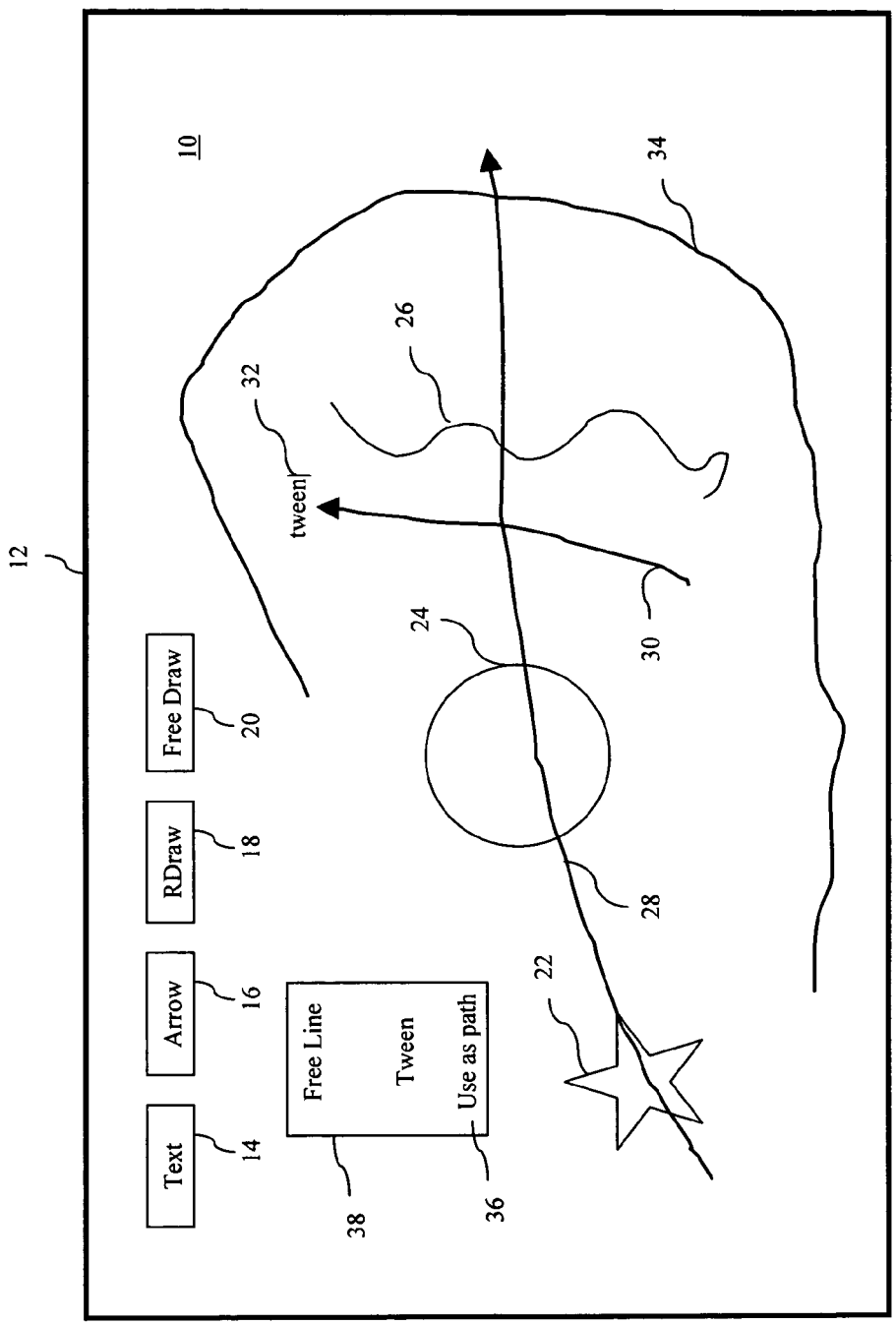
FIG. 3 shows how to create a tweening animation in which an intersected graphic object is used as the path for the tweening animation in accordance with an embodiment of the invention.

The path for the motion of shapes in the tweening animation can also be defined by the user in the following manner. In addition to the graphic objects that are to be included in the tweening animation, the user can create a graphic object to be used as the path for the tweening animation. As an example, the user can draw a line 34 on the Blackspace surface 10 that represents the desired path, as shown in FIG. 3. The line 34 is then intersected, along with the star 22, the circle 24 and the line 26 by drawing the arrow 28. Next, the modifier arrow 30 is drawn and the text "tween" is entered in the same manner as described above. The line 34 is then set to be used as the path for the tweening animation by entering an appropriate command, such as clicking on a "use as path" command entry 36 of an Info Canvas object 38 for the line 34. The term "Info Canvas" is a trademark of NBOR Corporation. An Info Canvas object for the Blackspace canvas or any graphic object in the Blackspace environment provides entries to change the properties of the Blackspace environment or the associated graphic object or control functions related to the Blackspace environment or the associated object. Thus, an Info Canvas object serves as a menu for the Blackspace environment or an associated graphic object. For more information about Info Canvas objects, see pending U.S. patent application Ser. No. 10/671,953, entitled "Intuitive Graphic User Interface with Universal tools", filed on Sep. 26, 2003. In any instance described herein when an entry of an Info Canvas object is used, an entry of a conventional menu or its equivalent can instead be used.

When the first arrow 28 or the modifier arrow 30 is now activated, a tweening animation of the intersected graphic objects, i.e., the star 22, the circle 24 and the line 26, is again created and automatically played in the Blackspace environment 10. However, the path of motion in the tweening animation will follow the path represented by the line 34. Thus, when the tweening animation is played, the star 22 is first displayed at one end of the line 34, which is not displayed in the Blackspace environment 10 when the tweening animation is played. The star 22 then changes to the circle 24 and then to the line 26, following the path represented by the line 34. Although in this example, a hand drawn line was used to define the path for the tweening animation, any shape can be used to define the path, even enclosed shapes, such as a hand drawn circle and a recognized star. Note: the time that it takes to tween from one object to the next can be controlled by a software default time, e.g., 3 seconds or it can be user-defined.

The tweening animation can also be configured to be centered at a fixed position, e.g., the center point of the first intersected graphic object. This can be achieved by selecting a "center" entry in an Info Canvas object (not shown) for the arrow 28 or 30. The resulting tweening animation will change in shape but remain fixed about the center point of the first intersected graphic object, e.g., the star 22.

In an embodiment, the tweening animation created in accordance with the invention is a Dyomation media. The term "Dyomation" is a trademark of NBOR Corporation. A Dyomation media includes the recording of a sequence of computer instructions to perform specific sets of actions in real time. These instructions are fully editable in time and in space. When the Dyomation media is played, the instructions are executed in sequence to produce a video-like replay of the Blackspace environment, including changes to properties of the graphic objects in the Blackspace environment. Thus, property changes of one or more graphic objects in the Blackspace environment can be recorded and/or played back using a Dyomation media. For more information about Dyomation media, see pending U.S. patent application Ser. No. 10/672,391, entitled "System and Method for Recording and Replaying Property Changes on Graphic Elements in a Computer Environment", filed on Sep. 26, 2003, in which Dyomation media is referred to as "Drawmation".

Figure 4:
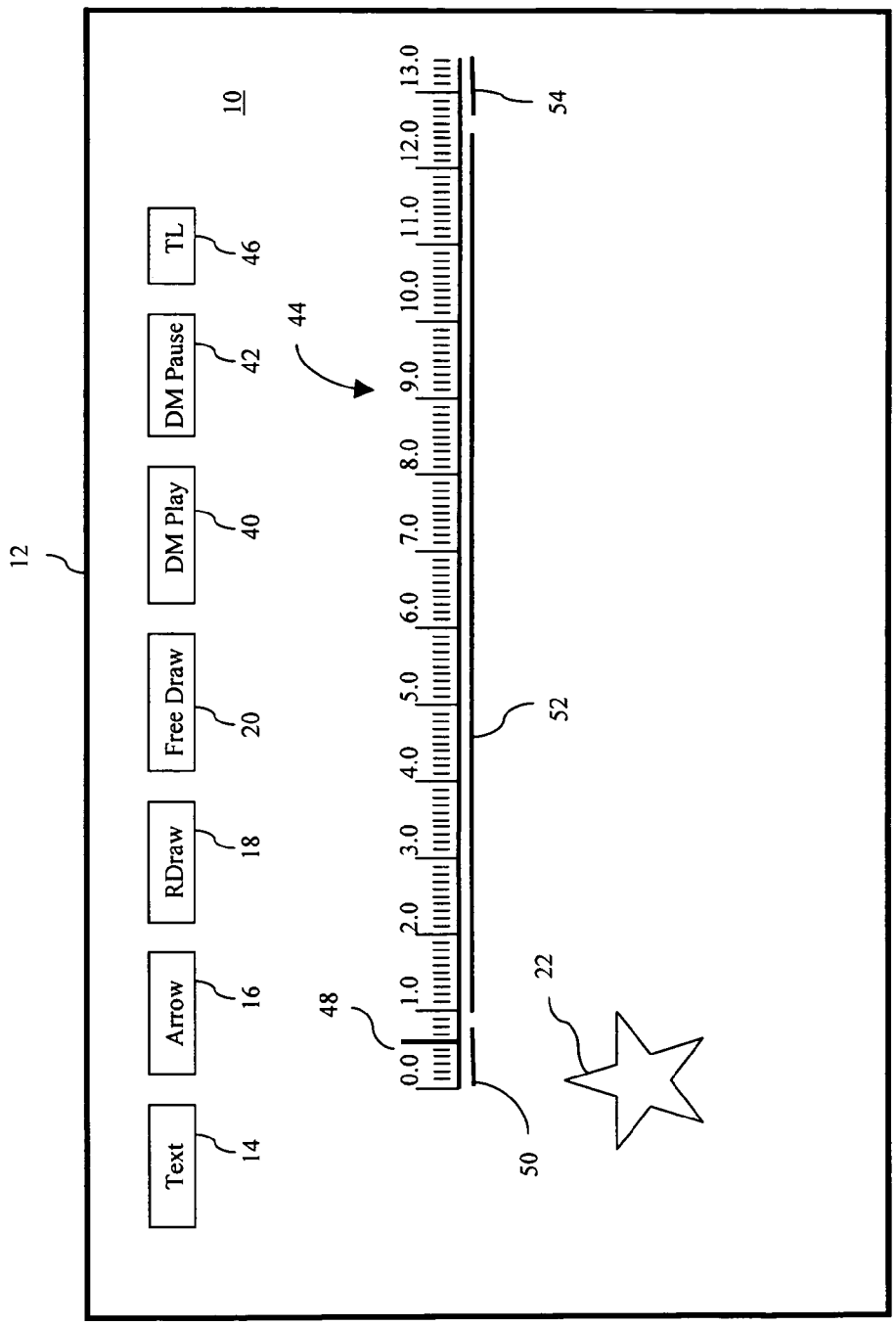
FIG. 4 shows a linear timeline that can be used to control and modify a tweening animation in accordance with an embodiment of the invention.

Since the created tweening animation is contained in a Dyomation media, the tweening animation can be controlled in the same manner as other Dyomation media. As an example, the tweening animation can be played and paused using a Dyomation play ("DM Play") switch 40 and a Dyomation pause ("DM Pause") switch 42, as shown in FIG. 4. As another example, a linear timeline may be used to navigate through the tweening animation. In FIG. 4, a linear timeline 44 in accordance with an embodiment of the invention is shown. The linear timeline 44 can be made to appear on the screen by pressing a timeline "TL" switch 46. The linear timeline 44 shows the progress of a tweening animation being played. The linear timeline 44 can be replaced with another type of timeline, such as a rectangular timeline. The linear timeline 44 includes a play cursor 48 that linearly moves along the length of the linear timeline when the tweening animation is played, reflecting the current play position in the tweening animation. The play cursor 48 can be manipulated by the user to navigate to any position in the tweening animation. If the DM play switch 40 is then activated, then the tweening animation will play from that position. The linear timeline 44 further includes three playbars 50, 52 and 54. The playbar 50 represents the duration of time in the tweening animation during which the first graphic object remains displayed without any change, which is referred to herein as the "first segment" of the tweening animation. The playbar 52 represents the duration of time in the tweening animation during which the first graphic object is changed and/or moved with respect to the last graphic object, which is referred to herein as the "second segment" of the tweening animation. The playbar 54 represents the duration of time in the tweening animation during which the last graphic object remains displayed without any change, which is referred to herein as the "third segment" of the tweening animation. The playbars 50, 52 and 54 are independently adjustable so that a user can shorten or lengthen the playbars. Shortening a playbar will decrease the duration of the tweening animation associated with that playbar, while lengthening a playbar will increase the duration of the tweening animation associated with that playbar.

As another example, a user-manipulable control device such as a graphic fader can be assigned to the tweening animation such that a user can have complete control of the tweening animation. Thus, a user-manipulable control device can be used to navigate through the tweening animation in the forward or reverse direction at different speeds and to stop at any position in the tweening animation. The manner in which a user-manipulable control device is assigned to a tweening animation is described with reference to FIG. 5.

Figure 5:
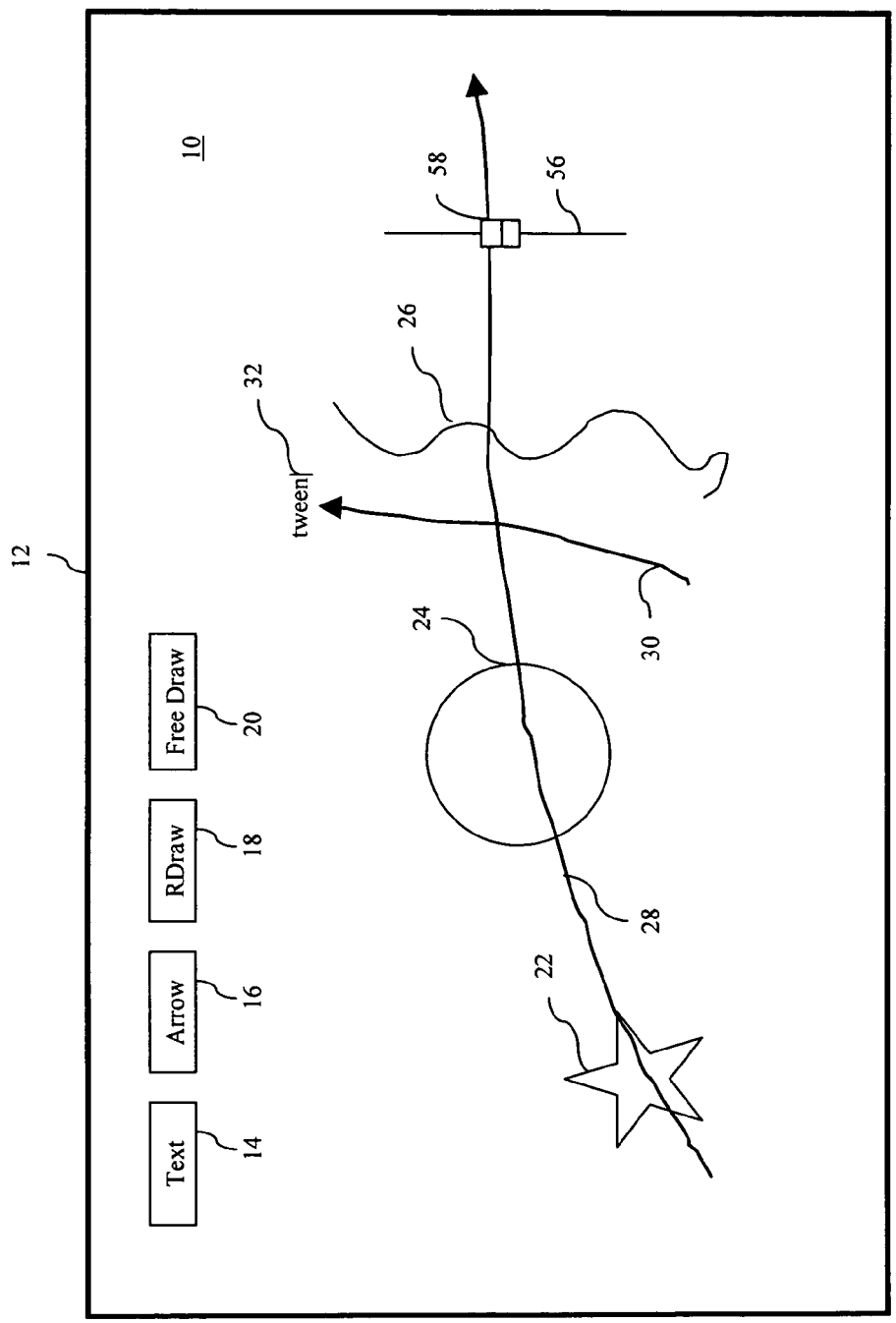
FIG. 5 shows how to create a tweening animation that is controllable by a graphic fader in accordance with an embodiment of the invention.

In FIG. 5, the star 22, the circle 24 and the line 26 are displayed in the Blackspace environment 10. In addition, a user-manipulable graphic control device in the form of a graphic fader 56 is also displayed in the Blackspace environment 10. The fader 56 may be created by turning on the recognize draw switch 18, drawing a line and then drawing a semicircle that intersect that line. The line and the intersecting semicircle will be recognized as a representation of a fader, and thus, will be substituted with the computer-generated fader 56. As an optional step, the word "tween" or other predefined word may be associated with the fader 56 to assign the functionality of controlling a tweening animation to the fader. Alternatively, this functionality will subsequently be assigned automatically due to the context in which the fader 56 will be associated. For more information regarding the assigning of behaviors to contexts see simultaneously filed U.S. patent application Ser. No. 10/940,507 entitled "Method for Creating User-Defined Computer Operations Using Arrows."

The procedure for creating a tweening animation of the star 22, the circle 24 and the line 26 that can be manipulated by the fader 56 is similar to the procedure for creating the tweening animation of the same objects, as described above with reference to FIG. 1. A difference is that the fader 56 is intersected along with the star 22, the circle 24 and the line 26, for example, by drawing the arrow 28 that intersects or contacts all of these objects. Next, the modifier arrow 30 is drawn to intersect or contact the arrow 28 and "tween" is entered when prompted by the text cursor 32.

When the first arrow 28 or the modifier arrow 30 is now activated, a tweening animation of the source objects except for the fader 56, i.e., the star 22, the circle 24 and the line 26, is created, but the tweening animation is not automatically played, e.g., by turning on the DM Play switch. Rather, the tweening animation is under the control of the fader 56. Thus, a user can control the tweening animation using the fader 56. By moving the cap 58 of the fader 56 in one direction, e.g., up, the user can navigate through the tweening animation by causing the tween to play in the forward direction and stop at any position in the tweening animation. Similarly, by moving the fader cap 58 in the other direction, e.g., down, the user can navigate through the tweening animation in the:reverse direction and stop at any position in the tweening animation. In addition, by varying the speed of the fader cap movement, the speed at which the tweening animation is played in the forward or reverse direction can be controlled. This fader movement can then be memorized as an additional part of a Dyomation session and then played back. This way a user can very easily and quickly control not only the speed at which one object tweens to the next, but the shape of the tween. In other words, does the star immediately start to change into the circle, or does the star change very slowly at first and then change faster? Once the movement of the tween fader cap is recorded as part of a Dyomation session, the tweening animation can be played back by activating the DM Play switch or its equivalent. In other words, once the tween fader's movements are recorded, the action of tweening between the star, circle and hand drawn line becomes part of a Dyomation session and can be played back as such.

The amount of time it takes to tween from one object to the next (referred to herein as "the tween duration") in a tweening animation can be user-defined when the tweening animation is created. There are three methods in accordance with an embodiment of the invention to define the tween durations of a tweening animation by a user. The first method involves using one or more additional arrows to define the tween durations of a tweening animation. Using the first method, a user "intersects" graphic objects that are to be tweened with an arrow, e.g., a red arrow, that has a control logic designated for it. The user then draws a second arrow intersecting the shaft of the first drawn arrow. The second arrow is recognized as a modifier arrow and, as a result, a text cursor appears near its arrowhead or elsewhere onscreen. With this text cursor a user then types "tween" to signify that it is a tween modifier arrow. In order to define the tween duration between any two of the objects intersected by the first drawn arrow, the user draws a third arrow that intersects the first drawn arrow's shaft between any two of these objects. A value representing time (millisecond, seconds, etc.) is then entered, which will then be used as the time taken to change the shape of the tween control between the two objects directly on either side of the third drawn arrow. The tween duration between any other pair of objects intersected by the first drawn arrow can also be defined by the user by drawing an additional arrow and entering a time value in the same manner as described above.

Figure 6:
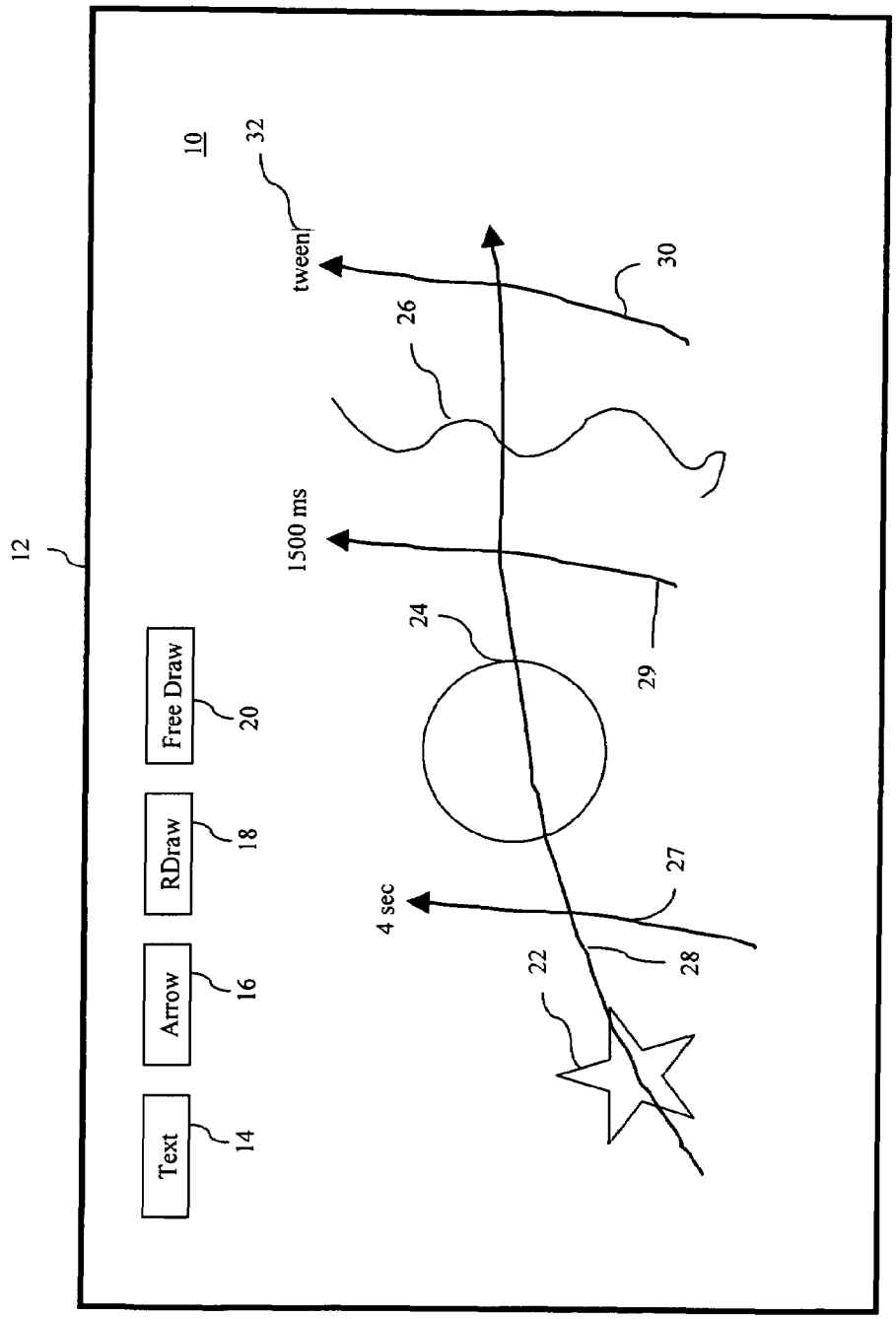
FIG. 6 shows how to define one or more tween durations of a tweening animation using modifier arrows in accordance with an embodiment of the invention.

This first method is illustrated using an example shown in FIG. 6. First, a user "intersects" a star 22, a circle 24 and a line 26 that are to be tweened with a control arrow, e.g., a red arrow 28, that has a control logic designated for it. The user then draws a second arrow 30 intersecting the shaft of the first arrow 28. The second arrow 30 is recognized as a modifier arrow and, as a result, a text cursor 32 appears near its arrowhead. The user then types "tween" to signify that it is a tween modifier arrow. In order to define the tween duration between the star 22 and the circle 24, the user draws a third arrow 27 that intersects the first arrow 28 between the star and the circle. A time value of "4 sec" is then entered, which will then be used as the time taken to change the shape of the tween control between the star 22 and the circle 24. In order to define the tween duration between the circle 24 and the line 26, the user draws a third arrow 29 that intersects the first arrow 28 between the circle and the line. Again, a time value is entered. In this example, the text "1500 ms" is entered for the fourth arrow 29, which will then be used as the time taken to change the shape of the tween control between the circle 24 and the line 26. To implement the arrow logic of the first drawn arrow and the modifier arrow "tween" and also the duration modifier arrows, a user can click on the white arrowhead of any of these arrows, which will turn white if their logic, modifier text or duration is valid for this context.

The second method for defining the tween durations for a tweening animation involves entering one or more time values and then dragging the time values onto a first arrow used to intersect objects for a tweening animation. Using the second method, a user "intersects" graphic objects that are to be tweened with a control arrow, e.g., a red arrow. The user then draws a second arrow intersecting the shaft of the first drawn arrow. The second arrow is recognized as a modifier arrow and, as a result, a text cursor appears near its arrowhead. The user then types "tween" to signify that it is a tween modifier arrow. In order to define the tween duration between the two intersected objects, the user types text specifying a period of time (e.g., a number of second or milliseconds) in the Blackspace environment, and presses the ESCAPE key to end text entry. The text object is then dragged to intersect the first drawn arrow's shaft between a pair of objects that this first drawn arrow intersects. If the text represents a valid period of time, then that duration will be used as the time taken to change the shape of the tween control between the two objects directly on either side of the point where the dragged text intersects the first drawn arrow's shaft. The tween duration between any other pair of intersected objects can be defined by the user by entering text specifying a period of time, dragging the text to intersect the first drawn arrow's shaft in the same manner as described above.

Figure 7:
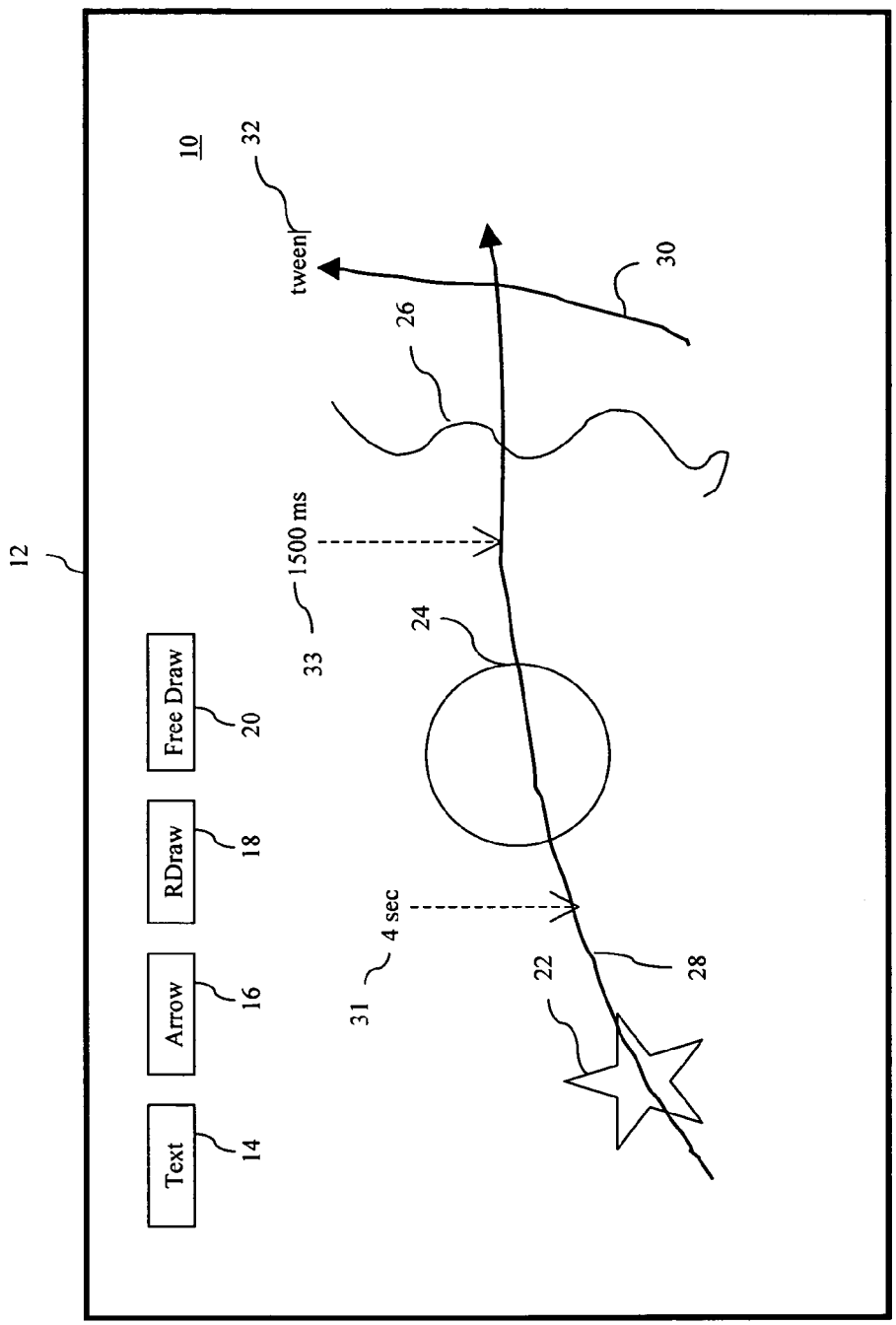
FIG. 7 shows how to define one or more tween durations of a tweening animation using text objects on a first drawn and recognized arrow in accordance with an embodiment of the invention.

This second method is illustrated using an example shown in FIG. 7. First, a user "intersects" a star 22, a circle 24 and a line 26 that are to be tweened with a control arrow, e.g., a red arrow 28. The user then draws a second arrow 30 intersecting the shaft of the first drawn arrow 28. The second arrow 30 is recognized as a modifier arrow and, as a result, a text cursor 32 appears near its arrowhead. The user then types "tween" to signify that it is a tween modifier arrow. In order to define the tween duration between the star 22 and the circle 24 using this second method, the user types text of "4 sec" 31 specifying a period of time in the Blackspace environment 10, and then presses the ESCAPE key or its equivalent to end the text entry. The text object 31 is then dragged to intersect the first arrow 28 between the star 22 and the circle 24. As a result, the duration of four seconds will be used in the resulting tweening animation as the time taken to change the shape of the tween control between the star 22 and the circle 24. Similarly, in order to define the tween duration between the circle 24 and the line 26, the user enters text of "1500 ms" 33, and then presses the ESCAPE key to end text entry. The text object 33 is then dragged and dropped onto the first arrow 28 between the circle 24 and the line 26. As a result, the duration of 1500 milliseconds will be used in the resulting tweening animation as the time taken to change the shape of the tween control between the circle 24 and the line 26.

Note: As an alternate to typing text that equals a duration time (e.g., 4 sec, 1500 ms), a user could use a verbal input or the user could drag a time (represented as a piece of text or a symbol or the like) from a menu to intersect the shaft of a drawn arrow being used for a tween function. Another approach would be to draw an object that represents a duration and drag this object to intersect the shaft of a drawn arrow being used for a tween function. An alternate to the dragging of text would be to place a text cursor directly onto the shaft of the first drawn arrow and type a tween duration time. Then when that text is entered into the system, by hitting Enter or Esc or its equivalent, the same will result as described above when such text was dragged to intersect the first drawn arrow's shaft.

The third method for defining tween timing involves entering one or more time values and then dragging the time values onto one or more intersected objects. Using the third method, a user "intersects" graphic objects that are to be tweened with a control arrow, e.g., a red arrow. The user then draws a second arrow intersecting the shaft of the first drawn arrow. The second arrow is recognized as a modifier arrow and, as a result, a text cursor appears near its arrowhead. The user then types "tween" to signify that it is a tween modifier arrow. In order to define the tween duration for any pair of objects intersected by the first drawn arrow, the user types text specifying a period of time (e.g., a number of second or milliseconds) in the Blackspace environment, and presses the ESCAPE key to end the text entry. The text object is then dragged to intersect one of the objects currently being intersected by the first drawn arrow's shaft. If the text represents a valid period of time, then that duration will be used as the time taken to change the shape of the tween control between the object onto which the duration-specifying text object has been dragged to intersect and the next object in the tweening animation sequence. The tween duration between any other object intersected by the shaft of the first drawn arrow can be defined by the user by entering text specifying a period of time, dragging the text to intersect that object in the same manner as described above.

Figure 8:
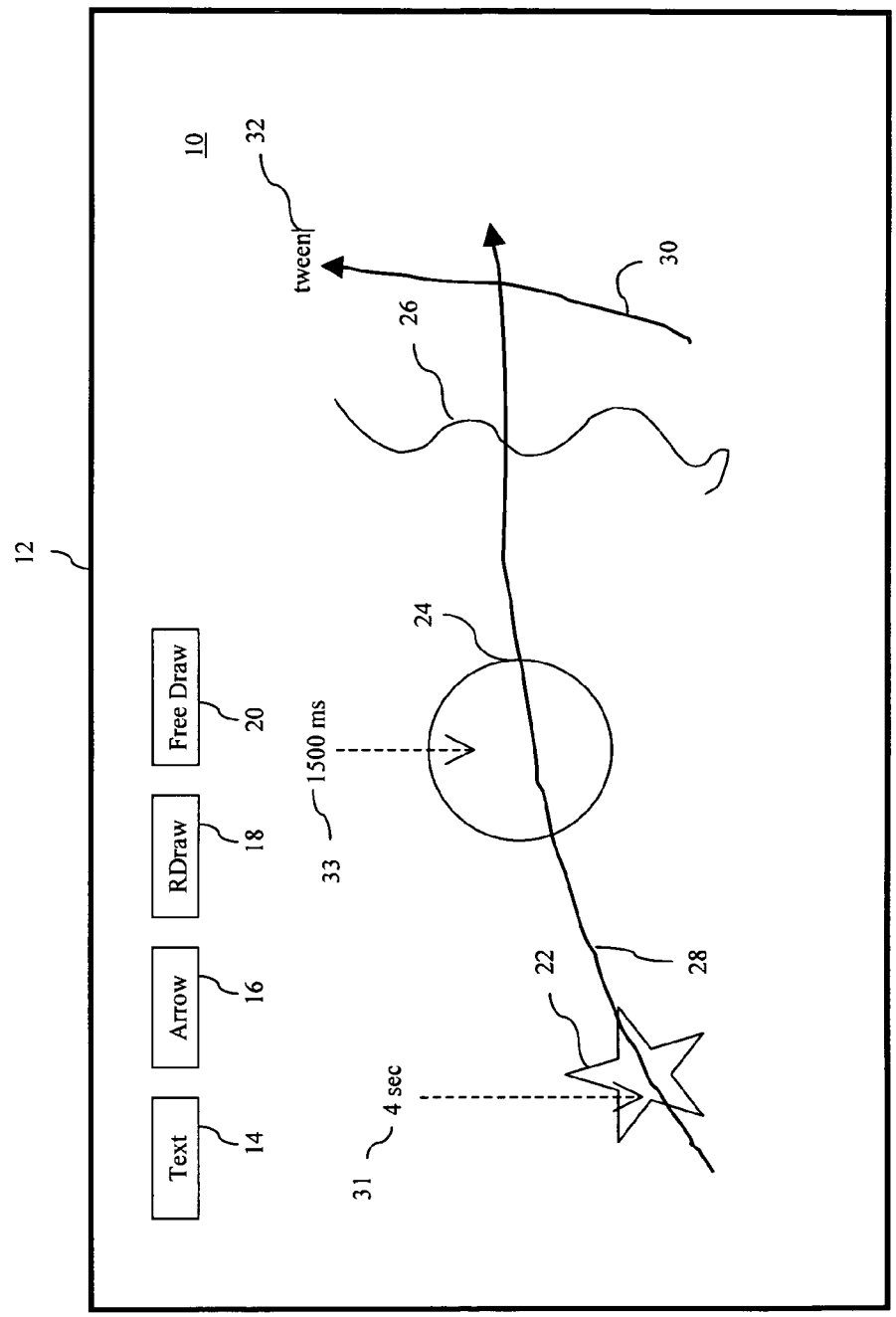
FIG. 8 shows how to define one or more tween durations of a tweening animation using text objects on one or more graphic objects of the tweening animation in accordance with an embodiment of the invention.

This third method is illustrated using an example shown in FIG. 8. First, a user "intersects" a star 22, a circle 24 and a line 26 that are to be tweened with a control arrow, e.g., a red arrow 28. The user then draws a second arrow 30 intersecting the shaft of the first drawn arrow 28. The second arrow 30 is recognized as a modifier arrow and, as a result, a text cursor 32 appears near its arrowhead. The user then types "tween" to signify that it is a tween modifier arrow. In order to define the tween duration between the star 22 and the circle 22 using this second method, the user types text of "4 sec" 31 specifying a period of time in the Blackspace environment 10, and then presses the ESCAPE key to end text entry. The text 31 is then dragged and released on the star 22. As a result, the duration of four seconds will be used in the resulting tweening animation as the time taken to change the shape of the tween control between the star 22 and the circle 24. Similarly, in order to define the tween duration between the circle 24 and the line 26, the user enters text of "1500 ms" 33, and then presses the ESCAPE key to end text entry. The text object 33 is then dragged and dropped onto the circle 24. As a result, the duration of 1500 milliseconds will be used in the resulting tweening animation as the time taken to change the shape of the tween control between the circle 24 and the line 26.

In an alternative implementation, a single text object may be used repeatedly to define additional tween durations. This implementation is applicable to the second and third methods described above. In this implementation, once a duration-specifying text object has been released on a first drawn arrow or an intersected object, the text object is returned to the text object's initial position (before it was dragged). This allows the text object to be reused, edited and/or dragged and related on a different position of the first drawn arrow or a different graphic object intersected by this arrow's shaft to set another tween duration.

Figure 9:
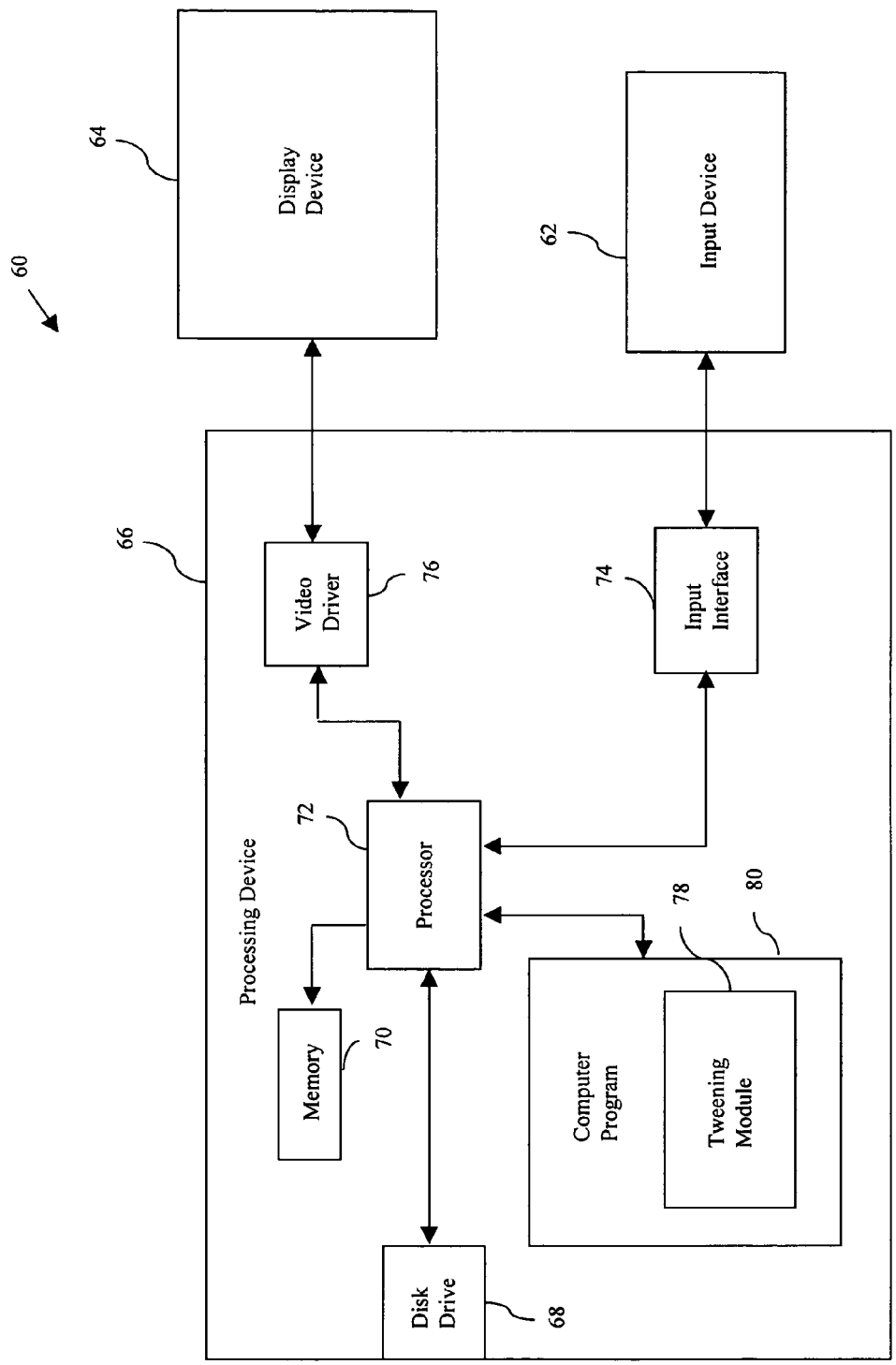
FIG. 9 is a block diagram of a system for creating and playing tweening animations in accordance with an embodiment of the invention.

Turning now to FIG. 9, a computer system 60 for creating and playing tweening animations in accordance with an embodiment of the invention is shown. The computer system 60 may be a personal computer, a personal digital assistant (PDA) or any computing system with a display device. As shown in FIG. 9, the computer system 60 includes an input device 62, a display device 64 and a processing device 66. Although these devices are shown as separate devices, two or more of these devices may be integrated together. The input device 62 allows a user to input commands into the system 60 and to draw graphic objects, including arrows, to create and play tweening animations. The input device 62 may include a computer keyboard and a mouse. However, the input device 62 may be any type of electronic input device, such as buttons, dials, levers and/or switches on the processing device 66. Alternative, the input device 62 may be part of the display device 64 as a touch-sensitive display that allows a user to input commands using a stylus. The display device 64 may be any type of a display device, such as those commonly found in personal computer systems, e.g., CRT monitors or LCD monitors.

The processing device 66 of the computer system 60 includes a disk drive 68, memory 70, a processor 72, an input interface 74, and a video driver 76. The processing device 66 further includes a tweening module 78, which performs operations related to creating and playing tweening animations. As shown in FIG. 9, the tweening module 78 may be implemented as part of a computer program 80, e.g., a Blackspace program that provides a Blackspace operating environment. In one embodiment, the tweening module 78 is implemented as software. However, the tweening module 78 may be implemented in any combination of hardware, firmware and/or software.

The disk drive 68, the memory 70, the processor 72, the input interface 74 and the video driver 76 are components that are commonly found in personal computers. The disk drive 68 provides a means to input data and to install programs into the system 60 from an external computer readable storage medium. As an example, the disk drive 68 may a CD drive to read data contained in an inserted CD. The memory 70 is a storage medium to store various data utilized by the computer system 60. The memory 70 may be a hard disk drive, read-only memory (ROM) or other forms of memory. The processor 72 may be any type of digital signal processor that can run the computer program 80, including the tweening module 78. The input interface 74 provides an interface between the processing device 66 and the input device 62. The video driver 76 drives the display device 64. In order to simplify the figure, additional components that are commonly found in a processing device of a personal computer system are not shown or described.

Figure 10:
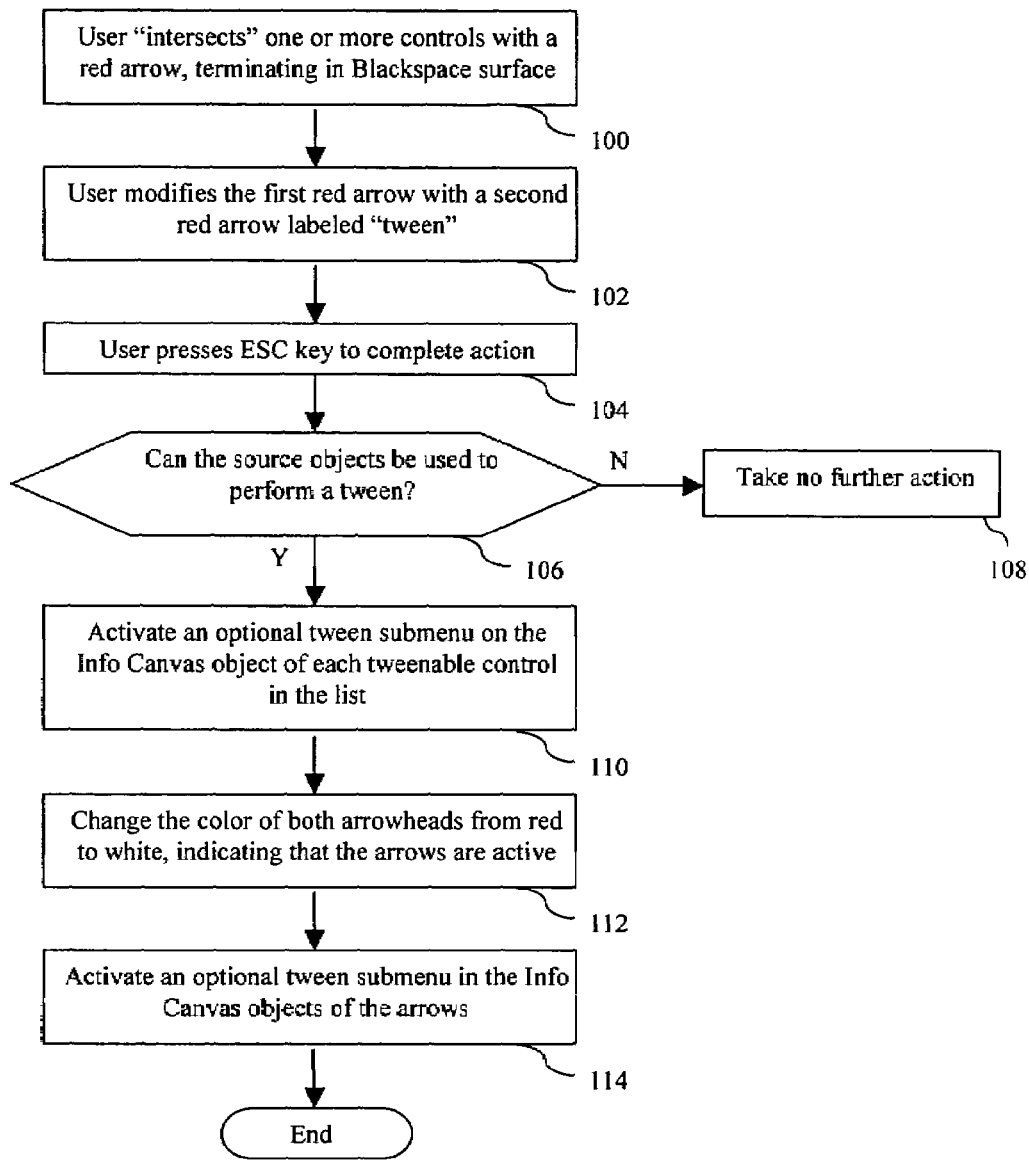
FIG. 10 is a flowchart of a process of intersecting graphic objects to create a tweening Info Canvas submenu in accordance with an embodiment of the invention.

The operations performed by the tweening module 78 to create and play a tweening animation in accordance with an embodiment of the invention are described with reference to flow charts of FIGS. 10, 11, 12 and 13. FIG. 10 is a flowchart of a process of intersecting graphic objects to create a tweening Info Canvas submenu in accordance with an embodiment of the invention. At block 100, a user "intersects" one or more objects with a red arrow pointing to blank Blackspace surface. As described above, the term "intersect" includes intersecting, nearly intersecting and/or enclosing controls. "Objects" include geometric shapes, free-drawn lines, pictures, videos, charts, diagrams, text, folders, devices (e.g., faders, knobs, switches) and anything else that can exist in the Blackspace environment. Source object candidates are created by drawing a red arrow that intersects, contacts or encircles these objects and points to a section of blank Blackspace surface. Next, at block 102, the user modifies the first red arrow with a second red arrow labeled "tween". The first red arrow is modified by drawing a second red arrow that intersects or contacts the shaft of the first drawn red arrow. The second red arrow should begin and end in an unoccupied region of the Blackspace surface. When the second red arrow is properly drawn, a text cursor will appear onscreen, e.g., near the head of the second red arrow, allowing the use to type in the word "tween". Next, at block 104, the user presses the ESC key or another predefined key to complete the action of entering the word "tween".

Next, at block 106, a determination is made whether the source objects can be used to perform a tween. It is possible to include objects in the source list which cannot be used to generate a valid tweening animation sequence. The software examines each source object in the list to determine if they are all valid. A source object is considered valid for tweening if the arrow logic (now a modified control logic with the "tween" behavior) is capable of tweening that object. Objects have an internal "tweenable" flag which is set to true or false, indicating whether they are capable of being used for tweening or not. Valid source objects can be used to tween between or one of them can be used as a movement path along which one or more valid source objects may be moved. Tweening can be performed if the list of source objects contains at least two objects marked as tweenable or one object that can be used as a path and one other object that can move along that path.

If none of the source objects (or not enough of them) can be used to perform a tween, then the process proceeds to block 108, where no further action is taken. As a result, the arrowheads of the first and second red arrows remain red, indicating that the first and red arrows are inactive. For all source objects that can be used to perform a tween, a dynamic tween submenu appears in each of their Info Canvas objects, at block 10. When intersected objects can be used to perform a tween, the Info Canvas object of each tweenable object is changed to include a tween submenu, and thus, the tween submenu can be subsequently accessed by a user to control the manner in which the tweening animation is generated. One of the options on the tween submenu sets a "use as path" flag, indicating that the control for which that flag is set should be used as the path along which another control may be moved during the tweening animation.

Next, at block 112, the color of both arrowheads of the first and second red arrows is changed from red to white, indicating that the first and second red arrows are active. As a result, either one of the white arrowheads can be clicked on to generate a tweening animation using the list of source objects.

Next, at block 114, an optional tween submenu in the Info Canvas objects of the first drawn and modifier red arrow is activated. Similar to the source objects, the Info Canvas objects of the first drawn and modifier red arrow are changed to include a tween submenu, which contains a "center" flag. If the user sets this flag to true by clicking on the menu option, then the tweening animation will center all the intermediate shapes on one central point, instead of moving the intermediate shapes along a path. The process then comes to an end, at which point, control is returned to the user. If the user is intending to generate a Dyomation animation sequence using the intersected objects, then the user may optionally specify the times taken to tween between the shapes of the intersected objects. This is described with reference to the flowchart of FIG. 12.

Figure 11:
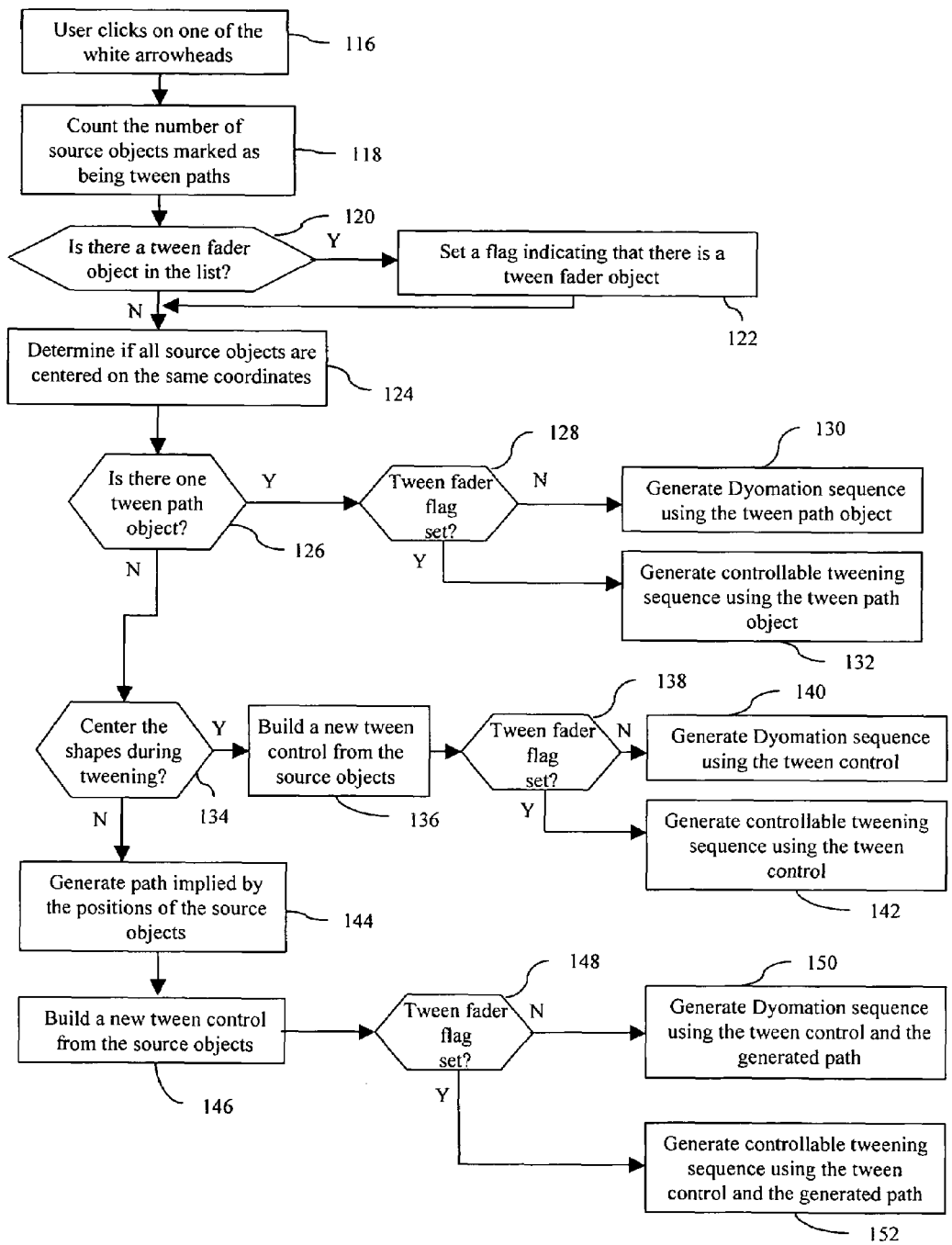
FIG. 11 is a flowchart of a process for creating a tweening animation from valid source objects in accordance with an embodiment of the invention.

FIG. 11 is a flowchart of a process for creating a tweening animation from valid source objects in accordance with an embodiment of the invention. At block 116, the user left-clicks on the white arrowhead of the first drawn or the modifier red arrows. Next, at block 118, the number of source objects with "use as path" flag set to true is counted. The "use as path" flag for a control may be toggled on or off by the user by clicking on the "use as path" option in the Info Canvas objects of that object.

Next, at block 120, a determination is made whether there is a tween fader object in the list of source objects. A tween fader object may be an unlabeled fader or a fader that has had the label "tween" applied to it. If one of the source objects is a tween fader object, then the tween fader object will not become part of a generated tween control. Rather, it will cause a flag to be set, which indicates that instead of generating a Dyomation sequence, the tween control will be connected to the tween fader object. This will allow the user to modify the time that one source object will change into another by moving the fader's cap to one or more new positions. This also offers the user the added benefit of the user being able to control the shape of the tween's speed between each object. In other words, how fast one shape changes over time into another shape, e.g., does one shape change in a linear fashion into another shape or in a logarithmic fashion or in some other mathematical curve. In fact, the manner in which a user moves the fader cap for the fader control, as described above, directly determines these mathematical curves of change, so the user never needs to type numbers to create such curves. They are created intuitively.

If there is a tween fader object, then an internal Boolean flag is set, at block 122, indicating that there is a tween fader object. This flag determines whether or not a Dyomation media is generated, or if the tween control is simply drawn on the screen under the control of the tween fader object. The process then proceeds to block 124.

If there is no tween fader object, then a determination is made whether all source objects are centered on the same coordinates, at block 124. This involves calculating the center point of each source object. If the center points are all the same, then an internal flag is set to true. When all the source objects are centered, there will be no need to generate a path for the resulting tweening animation from the center points of these source objects.

Next, at block 126, a determination is made whether there is precisely one tween path object, i.e., a source object with "use as path" flag set to true. If yes, then another determination is made whether the tween fader flag is set, at block 128. If no, then the process proceeds to block 130, where a Dyomation sequence is generated using the tween path object as the path for the tween sequence. (Dyomation timing is explained below with reference to FIG. 12) If yes, then the process proceeds to block 132, where a tweening sequence that is controllable by the tween fader is generated using the tween path object as the path for the tween sequence.

If there is no tween path object, then a determination is made whether the intermediates shapes of the tweening animation should be centered, at block 134. If yes, a new tween control is built from the source objects (ignoring the optional tween fader object), at block 136. (Further explained in detail below with reference to FIG. 13) Next, at block 138, a determination is made whether the tween fader flag is set. If no, then the process proceeds to block 140, where a Dyomation sequence is generated using the tween control. If yes, then the process proceeds to block 142, where a tweening sequence that is controllable by the tween fader is generated by the software.

If the intermediate shapes of the tweening animation should not be centered, then a path implied by the positions of the source objects is generated, at block 144. A list of vertices is generated from the center point of each object in the list of source objects (ignoring the optional tween fader object). This list of vertices will be used as the path along which to move each object to be tweened. Next, at block 146, a new tween control is built from the source objects (ignoring the optional tween fader object). Note: in this example where the fader object is not controlling the speed of tweening between source objects, this speed of tweening is according to a software default, e.g., 3 seconds. Next, at block 148, a determination is made whether the tween fader flag is set. If no, then the process proceeds to block 150, where a Dyomation sequence is generated using the tween control and the generated path. If yes, then the process proceeds to block 152, where a tweening sequence that is controllable by the tween fader is generated using the tween control and the generated path.

When a tweening Dyomation sequence is generated, the duration of the tweening Dyomation sequence is determined in one of several different ways. If the user does not specify the tween duration time between one or more objects, the tween time will be set to an application-defined default value (e.g., 3000 milliseconds). Once a graphic object has been selected for tweening (by a red control arrow modified by a "tween" modifier arrow), and before the white arrowhead of the first or modifier arrow is clicked, it has a "Tween" submenu added to that control's Info Canvas object (described above). The Tween submenu in the Info Canvas object of a tween object contains an editable text field labeled "Duration", which can be edited by the user to set the duration in milliseconds for that particular object. This determines time taken for the tween control (which will be created from the intersected objects) to change shape from one object to the next object in the list of intersected objects.

For example, say the user selects a square, a circle and a star. The user may right-click on the square and the circle in turn and set their tween duration times to 2000 milliseconds and 4000 milliseconds, respectively. (There is no need to set the duration for the last object in the tween Dyomation sequence, as it will not be changing shape to anything since there is nothing following it in the sequence.) When the tweening Dyomation sequence is played, it will be done in such a manner that it takes 2000 milliseconds for the tween control to change shape form the square to the circle, and then 4000 milliseconds for the tween control to change shape form the circle to the star. Three other methods of defining the time taken to tween between shapes were described above and will be further described with reference to the flowchart of FIG. 12.

Figure 12:
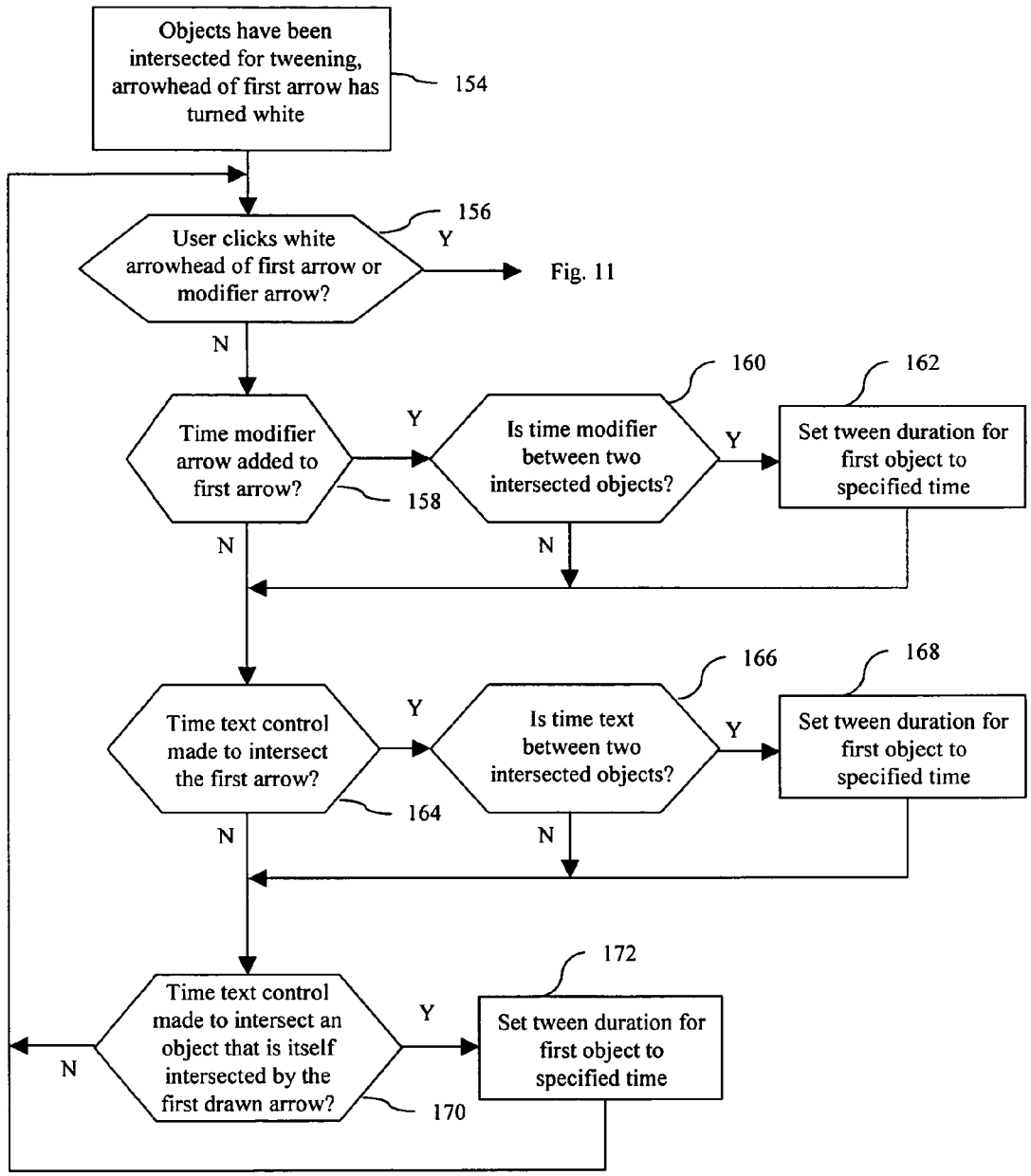
FIG. 12 is a flowchart of a process for defining one or more tween durations of a tweening animation in accordance with an embodiment of the invention.

FIG. 12 is a flowchart of a process for defining one or more tween durations of a tweening animation in accordance with an embodiment of the invention. This flowchart starts from the end of the flowchart of FIG. 11. A series of objects have been intersected by a drawn and recognized arrow that has had the logic "control" designated for it. A second drawn and recognized arrow intersects the shaft of the first arrow and the word "tween" has been typed as the behavior for this modifier arrow. Furthermore, the arrowhead of both the first and second drawn and recognized arrows have turned white.

At block 154, a collection of graphic objects (e.g., stars, circles, rectangles, pictures etc.) have been intersected by a red control arrow, and the red control arrow has been intersected by a red modifier arrow, which has been assigned the label "tween" to indicate that the intersected objects are to be used to generate a tweening Dyomation sequence (See flowchart of FIG. 10). The arrowheads of the red control arrow and the red modifier arrow will have turned white to indicate that the user may click on them to implement a tweening Dyomation sequence. Before the user clicks on the white arrowheads, the user may specify the time that each shape will take to change into the next shape in the sequence of shapes. For example, if the user has intersected a star, a circle and a rectangle to be used to generate a tweening Dyomation sequence, the user may wish to specify that the tween takes 4000 milliseconds (ms) to change from the star to the circle, and then 1500 ms to change from the circle to the rectangle.

Next, at block 156, a determination is made whether the user has clicked on the white arrowhead of the first or modifier arrow. If yes, the process proceeds to FIG. 11. When the user clicks on the white arrowhead (of either the first drawn and recognized red arrow or the "tween" modifier arrow), the tweening Dyomation sequence is implemented, which is explained in the flowchart of FIG. 11. If the first drawn arrow and the objects that the arrow intersects are valid for both the arrow logic designated for that arrow and the modified behavior assigned to it via the modifier arrow which intersects its shaft (in this case the modifier behavior is "tween"), then clicking on the white arrowhead of either the first drawn arrow or the modifier arrow will implement this arrowlogic and its modified behavior. In this case, a tweening Dyomation sequence will be created.

Next, at block 158, a determination is made whether a time modifier arrow has been added to the first arrow. That is, has the user intersected the first drawn arrow with a modifier arrow labeled with text that specifies a modifier behavior, which in this case is a period of time. If yes, then the process proceeds to block 160. If no, then the process proceeds to block 164. The modifier arrow begins on a blank region of screen space, intersects the first drawn arrow, and ends (has its tip pointing to) on a blank region of the screen's surface. After this modifier arrow is drawn and recognized by the software, a text cursor automatically appears onscreen. The user is then able to type text, using this cursor, to specify a time duration (in seconds, milliseconds, etc.). If the text cannot be interpreted as a valid period of time, this step will not proceed further and will go straight to block 164. The software is able to interpret the text if it includes "known" elements—items that the software understands as keywords or their equivalent. For example, a numerical value, e.g., 10, followed by a specifier of time, e.g., sec, ms, min and the like, would enable the software to convert the typed text into a behavior for the drawn and recognized modifier arrow.

At block 160, a determination is made whether the drawn and recognized time modifier arrow intersects the shaft of the first drawn arrow at a position between two of the graphic objects, which are intersected by the shaft of the first drawn arrow. If yes, the process proceeds to block 162. If no, the process proceeds to block 164.

At block 162, the tween duration for first object is set to specified time. When a modifier arrow (with a time behavior typed for it) intersects the shaft of the first drawn arrow, at a point between any two objects, which are also intersected by the shaft of this first drawn arrow, the object which appears earlier (e.g., object A) in the source list of the first drawn arrow has its tween time specified by that time modifier arrow. When the tweening Dyomation sequence is generated, this duration is used as the amount of time taken to change the shape of the tween control from object A to the next shape following that shape in the list of source objects for the first drawn arrow.

At block 164, a determination is made whether a time text control has been made to intersect the first arrow. That is, a determination is made whether a text object (which can be interpreted as a valid period of time by the software) has been dragged so that it intersects or nearly intersects the shaft of the first drawn and recognized arrow. If yes, the process proceeds to block 166. If no, the process proceeds to block 170.

At block 166, a determination is made whether the time text is between two intersected objects. That is, a determination is made whether the text object intersects the shaft of the first drawn and recognized arrow at a position between any two of the objects in the source list of this first drawn arrow. If yes, the process proceeds to block 168. If no, the process proceeds to block 170.

At block 168, the tween duration for first object is set to specified time. The text object intersects the shaft of the first drawn arrow between two objects on that arrow's source list. When this happens, the object which appears earlier in the source list has its tween duration set to the time specified by this text object. This time period will become the time that it takes for the object A in the source list to change to the next object in the source list.

At block 170, a determination is made whether a time text control is made to intersect an object that is itself intersected by the first drawn arrow. That is, a determination is made whether a text object (which can be interpreted by the software as a valid period of time) has been moved so that it intersects one of the objects in the source list for the first drawn arrow and a mouse upclick has been performed. If yes, the process proceeds to block 172. If no, the process proceeds to back to block 156.

At block 172, the tween duration for first object is set to specified time. The graphic object that the text object is intersecting or is nearly intersecting has its tween duration period set to the time specified by the dragged text object. When the tweening Dyomation sequence is generated, the duration is used as the amount of time taken to change the shape of the tween control from object A to the next shape in the source list for the first drawn arrow. The text object used for specifying time duration is then automatically returned (snapped back) the position on the display area which it occupied before it was moved to intersect object A. The process then proceeds back to block 156.

These three different methods for specifying tween duration time may be combined arbitrarily. That is to say that given a set of shapes (e.g., A, B, C and D—all intersected by a first drawn arrow) the user could set the time between A and B using a time modifier arrow, between B and C by dragging a text object to intersect the shaft of the first drawn arrow, and between C and D by dragging a text object to intersect object C.

Figure 13:
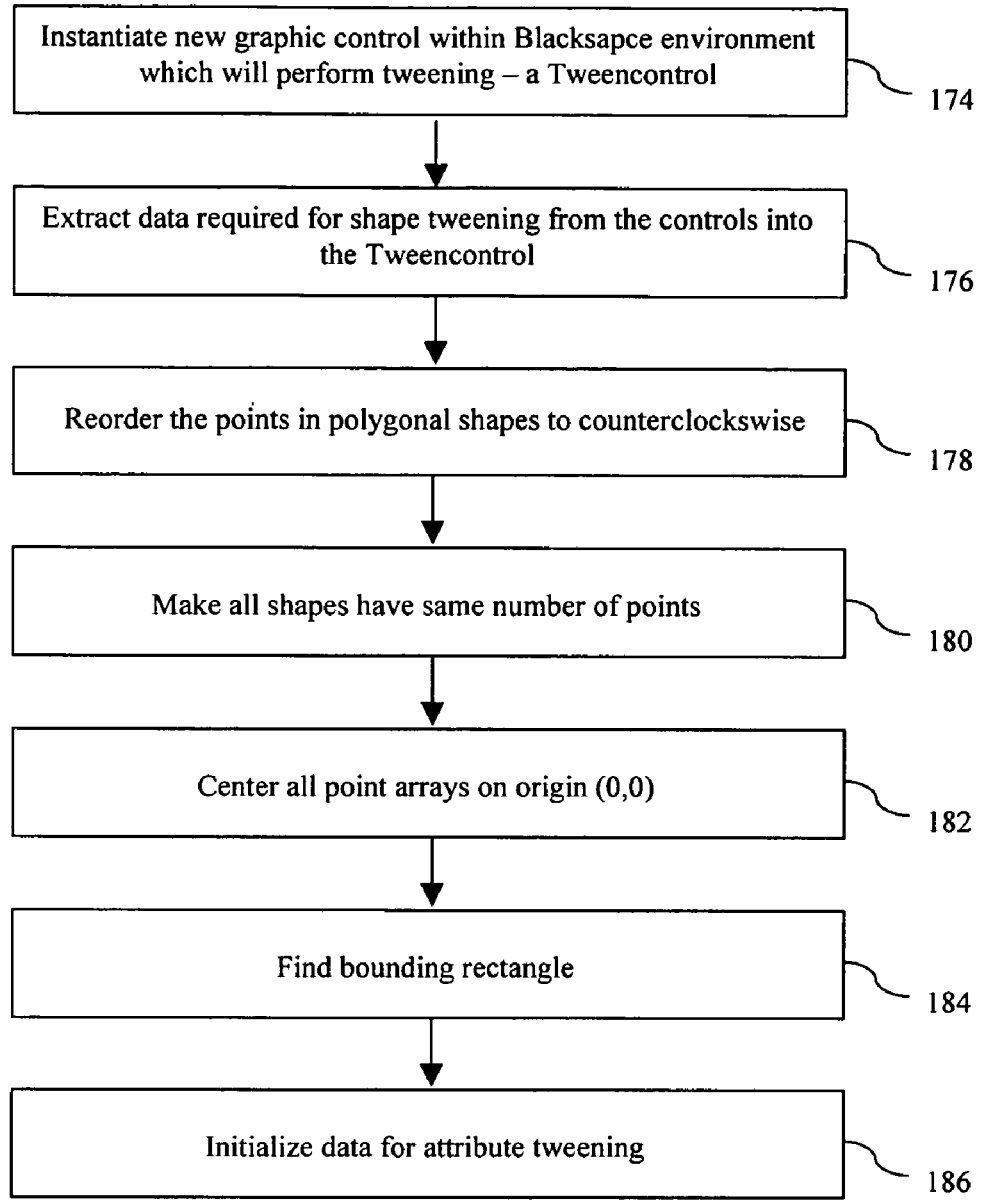
FIG. 13 is a flowchart of a process for creating a tween control in accordance with an embodiment of the invention.

FIG. 13 is a flowchart of a process for creating a tween control in accordance with an embodiment of the invention. This flowchart describes how a Tween Control is created from a list of graphical objects that have been "intersected" by a first drawn and recognized arrow with a control logic designated for it, and a modifier arrow has been drawn and recognized to intersect the shaft of this first drawn arrow and the modifier text "tween" has been typed for that modifier arrow to modify the control behavior of the first drawn arrow.

At block 174, a new C++ object of class CtweenControl is instantiated which will be displayed in the global drawing surface, the Blackspace surface. The source list of objects which have been intersected by the first drawn arrow, and which are to be used for tweening, is passed to the Tween-control after the white arrowhead of either the first drawn arrow or its modifier arrow has been clicked on. The Tweencontrol examines the contents of the source list to initialize itself prior to any tweening operations.

Next, at block 176, the points (two-dimensional and/or three-dimensional coordinates), which form the outline of each shape are copied and stored in the Tweencontrol. The Tweencontrol creates an array of internal data objects, one for each of the graphic objects in the source list, which is used to store data about each graphic object. At this stage, the outline points are stored.

Next, at block 178, polygonal objects (triangles, rectangles, stars, etc.) may have their outline points defined in an order that appears either clockwise or counterclockwise on the global drawing surface or on another version of screen space. To simplify the tweening calculations, the points for each object in the internal data array are reordered to ensure that all the shapes are counterclockwise. This is by example only. A clockwise ordering of the internal data array is acceptable as well.

Next, at block 180, all shapes are made to have the same number of points. One implementation of this invention provides for the tween algorithm to depend upon the shapes being tweened all having the same number of points. All of the point arrays stored in the internal data objects are modified to ensure that they all have the same number of points. For example, when tweening between a rectangle (which has four points) and a circle (which may have, for example, 100 points), it is necessary to subdivide the outline of the rectangle until it also has 100 points, but retains the original shape. This allows each of the 100 points in the rectangular shape to be moved to new locations which define shapes intermediate between a rectangle and a circle, until eventually they match the locations of the points defining the circle.

Next, at block 182, all of the points in the point array stored in the internal data objects are modified so that the shapes they describe are centered on the 2-dimensional coordinates (0,0). For each of the shapes, this is done by calculating the center point of each shape and subtracting the X/Y values of the center point from the X/Y value of each point defining each shape (a simple two-dimensional translation operation). This is done to simplify the calculation required when tweening between shapes. This step is only an example of a step that can be used to simply the calculation.

Next, at block 184, the bounding rectangle of all the internal point arrays defining the shapes to be tweened is calculated. This is done by finding the minima and maxima of the X/Y coordinates of each point in each point arrow. This step is optional and is only an example of a step that can be used for calculating the bounding rectangle. If a first drawn and recognized arrow intersects a triangle, for instance, the arrow must intersect a visible portion of the triangle. No behavior is assigned to this bounding rectangle. The bounding rectangle is used only to calculate the redrawing of portions of a drawn object as it tweens from one object to another.

Next, at block 186, data for tweening attributes is initialized. As well as storing the points defining each shape to be tweened, it is also necessary to store other information describing the graphical appearance of the shapes. The outline color, fill color, outline width, outline style (e.g., solid, dotted or dashed line) and alpha transparency value are all stored in the internal data objects associated with each of the controls in the original list of selected controls (described with reference to block 174). This allows the Tweencontrol to tween, for example, a star with a 1-pixel wide red outline and yellow fill color to a rectangle with a 5-pixel wide green outline and blue fill color. This step is only an example.

Figure 14:
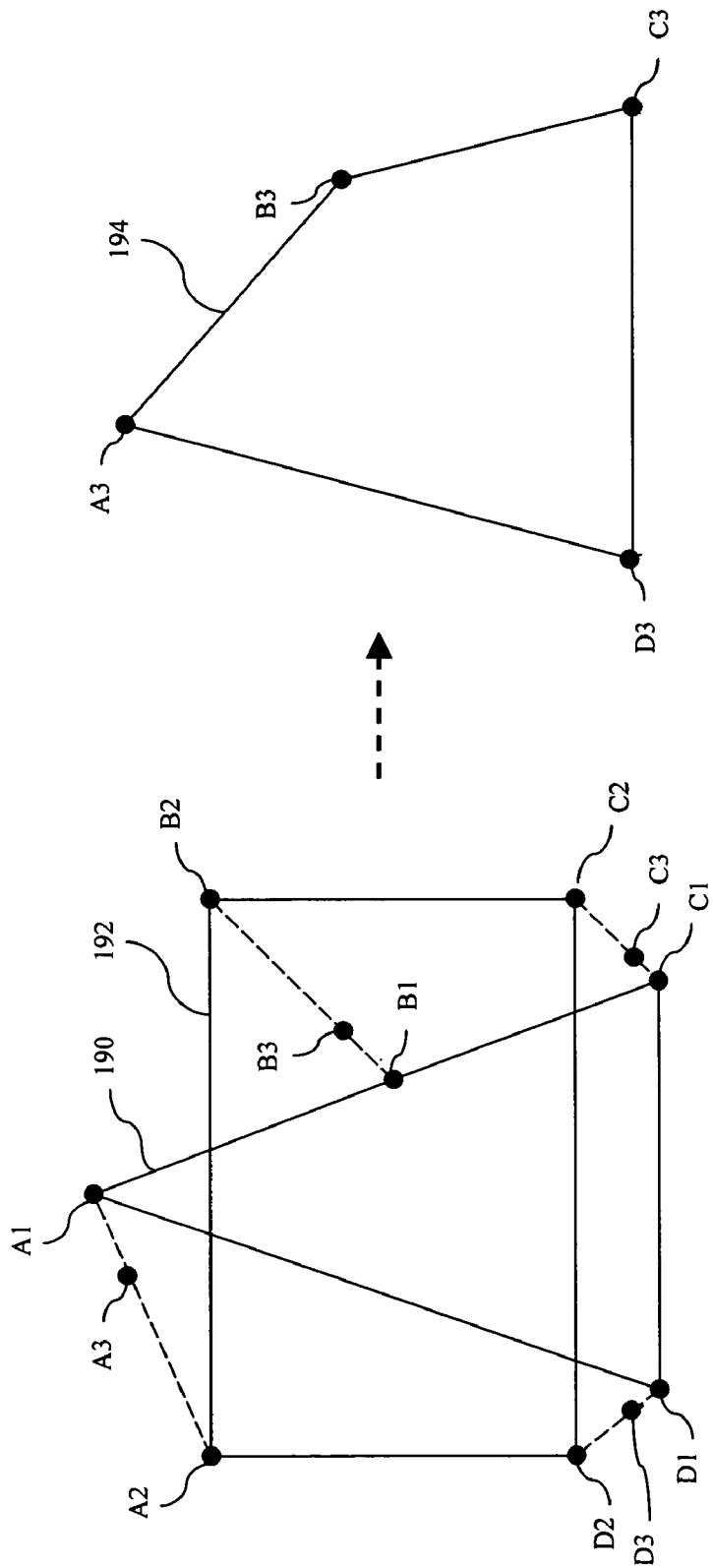
FIG. 14 illustrates a technique for tweening objects using a triangle and rectangle as examples.

A brief description of a technique for tweening a first object to a second object is now described using an example of a triangle 190 and a rectangle 192, as illustrated in FIG. 14. The triangle 190, like any triangle, is defined by three points A1, C1 and D1. The rectangle 192, like any rectangle, is defined by four points A2, B2, C2 and D2. In order to tween the triangle 190 to the rectangle 192, the number of points in both shapes has to be equal. Since the triangle 190 has a fewer number of points, a new point must be added to the triangle 190. This can be achieved by splitting the line A1-C1 at a location lying halfway between the two points A1 and C1, and then adding a fourth point B1 to the triangle at this location. If the triangle 190 had needed additional new points, then more lines would be split to add the new points. For example, if the triangle 190 is to be tweened to an ellipse, which may have 72 points, then the triangle would have to be subdivided until it also had 72 points (but remained looking like a triangle).

The tweening of the triangle 190 to the rectangle 192 now involves finding the appropriate point in the rectangle for each point of the triangle and then creating a new point between the corresponding points. This new set of points is the tweened shape to be drawn. As an example, to generate a shape that is 25% between the triangle 190 and the rectangle 192, new points A3, B3, C3 and D3 are created that are 25% of the distance between the points A1 to A2, B1 to B2, C1 to C2, and D1 to D2, respectively. This set of points A3, B3, C3 and D3 produces a tweened shape 194 to be drawn. Using this technique, a tweening animation can be played or navigated by telling the tween control to draw itself at different percentages between the shapes, starting at 0% and moving up to 100%.

Figure 15B:
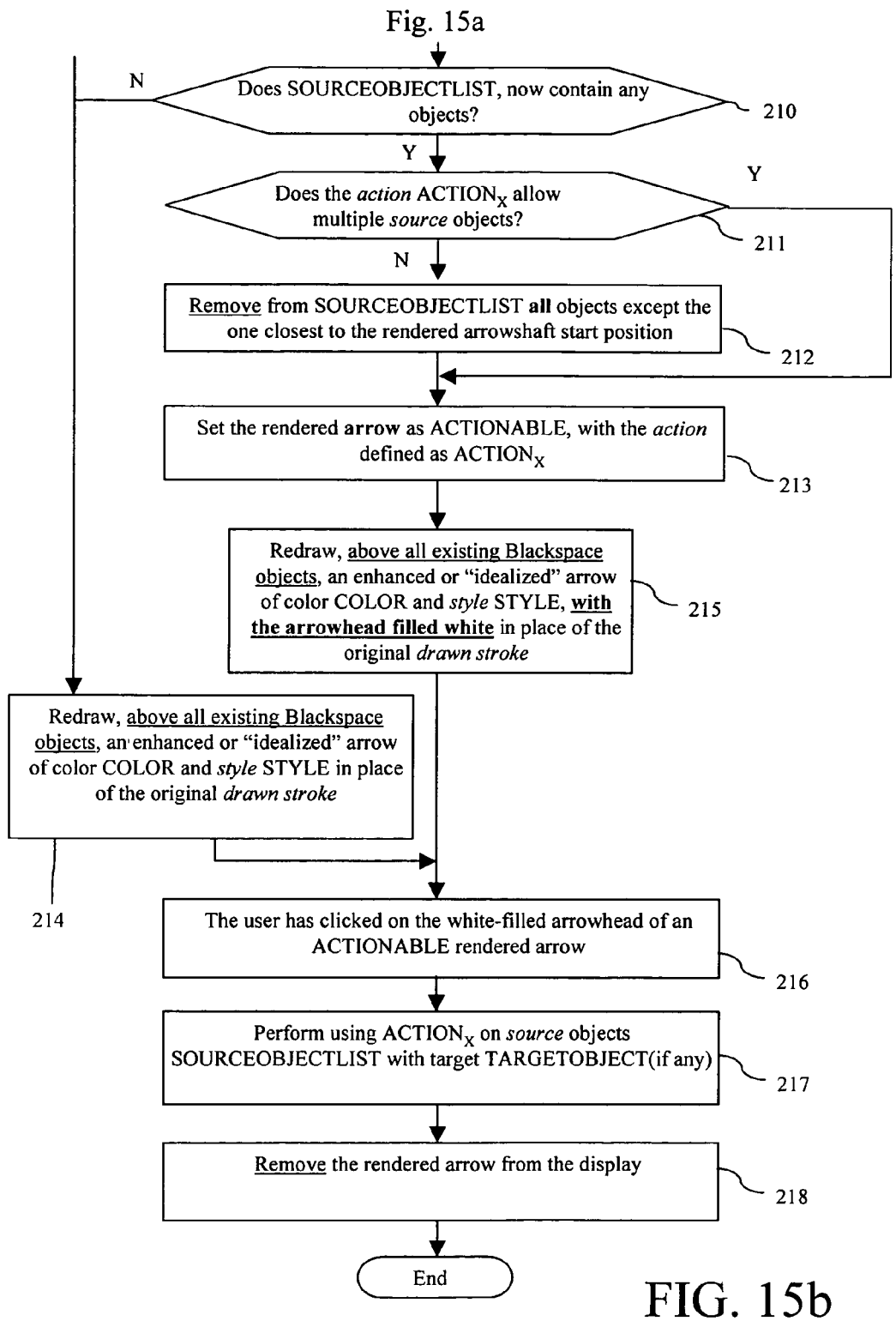

With reference to the flowchart of FIGS. 15*a* and 15*b*, the process for drawing arrows in Blackspace environment and applying and modifying an arrow logic in accordance with an embodiment of the invention is now described.

Step 201. A drawn stroke of color "COLOR" has been recognized as an arrow—a mouse down has occurred, a drawn stroke (one or more mouse movements) has occurred, and a mouse up has occurred. This stroke is of a user-chosen color. The color is one of the factors that determine the action ("arrow logic") of the arrow. In other words, a red arrow can have one type of action (behavior) and a yellow arrow can have another type of action (behavior) assigned to it.

Step 202. The style for this arrow will be "STYLE"—This is a user-defined parameter for the type of line used to draw the arrow. Types include: dashed, dotted, slotted, shaded, 3D, etc.

Step 203. Does an arrow of STYLE and COLOR currently have a designated action or behavior? This is a test to see if an arrow logic has been created for a given color and/or line style. The software searches for a match to the style and color of the drawn arrow to determine if a behavior can be found that has been designated for that color and/or line style. This designation can be a software default or a user-defined parameter.

If the answer to Step 203 is yes, the process proceeds to Step 204. If no, the process proceeds to Step 214.

Step 204. The action for this arrow will be ACTION$_x$, which is determined by the current designated action for a recognized drawn arrow of COLOR and STYLE. If the arrow of STYLE and COLOR does currently have a designated action or behavior, namely, there is an action for this arrow, then the software looks up the available actions and determines that such an action exists (is provided for in the software) for this color and/or style of line when used to draw a recognized arrow. In this step the action of this arrow is determined.

Step 205. Does an action of type $ACTION_x$ require a target object for its enactment? The arrow logic for any valid recognized arrow includes as part of the logic a determination of the type(s) and quantities of objects that the arrow logic can be applied to after the recognition of the drawn arrow. This determination of type(s) and quantities of objects is a context for the drawn arrow, which is recognized by the software.

Example 1: Let's say a red arrow is drawn between four (4) faders such that the arrow intersects all four faders. Let's further say the red arrow logic is a "control logic," namely, the arrow permits the object that it's drawn from to control the object that it's drawn to. Therefore, with this arrow logic of the red arrow, a target is required. Furthermore, the first intersected fader will control the last intersected fader and the faders in between will be ignored. See 211 and 212 in this flow chart.

Example 2: Let's say a yellow arrow is drawn between four faders, such that the arrow shaft intersects the first three faders and the tip of the arrow intersects the fourth fader. Let's further say that an "assignment" arrow logic is designated for the color yellow, namely, "every object that the arrow intersects will be assigned to the object that arrow points to." In this case, the arrow logic will be invalid, as a fader cannot be assigned to another fader according to this logic. Whereas, if the same yellow arrow is drawn to intersect four faders and the arrowhead is made to intersect a blue star, the four faders will be assigned to the star.

The behavior of the blue star will be governed by the yellow arrow logic. In this instance, the four faders will disappear from the screen and, from this point on, have their screen presence be determined by the status of the blue star. In other words, they will reappear in their same positions when the blue star is clicked on and then disappear again when the blue star is clicked once more and so on. Furthermore, the behavior of the faders will not be altered by their assignment to the blue star. They still exist on the Global drawing surface as they did before with their same properties and functionality, but they can be hidden by clicking on the blue star to which they have been assigned. Finally, they can be moved to any new location while they are visible and their assignment to the blue star remains intact.

Example 3: Let's say you draw a green arrow which has a "copy" logic assigned to it, which states, "copy the object(s) that the arrow shaft intersects or encircled to the point on the Global Drawing surface (Blackspace) that the tip of the arrowhead points to". Because of the nature of this arrow logic, no target object is required. What will happen is that the object(s) intersected or encircled by the green arrow will be copied to another location on the Global Drawing surface.

If the answer to Step 205 is yes, the process proceeds to Step 206. If no, the process proceeds to Step 208.

Step 206. Determine the target object TARGETOBJECT for the rendered arrow by analysis of the Blackspace objects which collide or nearly collide with the rendered arrowhead. The software looks at the position of the arrowhead on the global drawing surface and determines which objects, if any, collide with it. The determination of a collision can be set in the software to require an actual intersection or distance from the tip of the arrowhead to the edge of an object that is deemed to be a collision. Furthermore, if no directly colliding objects are found, preference may or not be given to objects which do not collide in close proximity, but which are near to the arrowhead, and are more closely aligned to the direction of the arrowhead than other surrounding objects. In other words, objects which are situated on the axis of the arrowhead may be chosen as targets even though they don't meet a strict "collision" requirement. In all cases, if there is potential conflict as to which object to designate as the target, the object with the highest object layer will be designated. The object with the highest layer is defined as the object that can overlap and overdraw other objects that it intersects.

Step 207. Is the target object (if any) a valid target for an action of the type $ACTION_x$? This step determines if the target object(s) can have the arrow logic (that belongs to the line which has been drawn as an arrow and recognized as such by the software) applied to it. Certain arrow logics require certain types of targets. As mentioned above, a "copy" logic (green arrow) does not require a target. A "control" logic (red arrow) recognizes only the object to which the tip of the arrow is intersecting or nearly intersecting as its target.

If the answer to Step 207 is yes, the process proceeds to Step 208. If no, the process proceeds to Step 210.

Step 208. Assemble a list, SOURCEOBJECTLIST, of all Blackspace objects colliding directly with, or closely with, or which are enclosed by, the rendered arrowshaft. This list includes all objects as they exist on the global drawing surface that are intersected or encircled by or nearly intersected by the drawn and recognized arrow object. They are placed in a list in memory, called for example, the "source object list" for this recognized and rendered arrow.

Step 209. Remove from SOURCEOBJECTLIST, objects which currently or unconditionally indicate they are not valid sources for an action of type $ACTION_x$ with the target TARGETOBJECT. Different arrow logics have different conditions in which they recognize objects that they determine as being valid sources for their arrow logic. The software analyzes all source objects on this list and then evaluates each listed object according to the implementation of the arrow logic to these sources and to the target(s), if any. All source objects which are not valid sources for a given arrow logic, which has been drawn between that object and a target object, will be removed from this list.

Step 210. Does SOURCEOBJECTLIST now contain any objects? If any source objects qualify as being valid for the type of arrow logic belonging to the drawn and recognized arrow that intersected or nearly intersected them, and such logic is valid for the type of target object(s) intersected by this arrow, then these source objects will remain in the sourceobjectlist.

If the answer to Step 210 is yes, the process proceeds to Step 211. If no, the process proceeds to Step 214.

Step 211. Does the action "$ACTION_x$" allow multiple source objects? A test is done to query the type of arrow logic belonging to the drawn and recognized arrow to determine if the action of its arrow logic permits multiple source objects to be intersected or nearly intersected by its shaft.

If the answer to Step 211 is yes, the process proceeds to Step 213. If no, the process proceeds to Step 212.

Step 212. Remove from SOURCEOBJECTLIST all objects except the one closest to the rendered arrowshaft start position. In this case, the recognized arrow logic can have only a single source. So the software determines that the colliding object which is closest to the drawn and recognized arrow's start position is the source object and then removes all other source objects that collide with its shaft.

NOTE: Certain types of arrow logics require certain types of sources. For instance, if a red "control" arrow is drawn to intersect four switches and then drawn to point to blank Blackspace surface (an area on the global drawing surface where no objects exist), then no valid sources will exist and no arrow logic will be applied. The "red" logic will be considered invalid. It's invalid because although the source objects are correct for this type of arrow logic, a suitable target object must exist for the "control" logic to be valid in the absence of a context that would override this requirement. If however, this same red arrow is drawn to intersect these same four switches and then the tip of the arrow also intersects or nearly intersects a fifth switch (a valid target for this logic), then the red arrow logic recognizes the first intersected switch only as its source and the last intersected switch only as the target. The other intersected switches that appeared on the "sourceobjectlist" will be removed.

Step 213. Set the rendered arrow as Actionable with the action defined as $ACTION_x$. After step 212, the required action has been identified and has not been immediately implemented because it awaits an input from a user. As an example, identifying the action would be to have the arrowhead of the drawn and recognized arrow turn white (see step 215). An example of input from a user would be requiring them to click on the white arrowhead to activate the logic of the drawn and recognized arrow (see steps 215-218).

Step 214. Redraw above all existing Blackspace objects an enhanced or "idealized" arrow of COLOR and STYLE in place of the original drawn stroke. If an arrow logic is not deemed to be valid for any reason, the drawn arrow is still recognized, but rendered onscreen as a graphic object only. The rendering of this arrow object includes the redrawing of it by the software in an idealized form as a computer generated arrow with a shaft and arrow head equaling the color and line style that were used to draw the arrow.

Step 215. Redraw above all existing Blackspace objects, an enhanced or "idealized" arrow of COLOR and STYLE with the arrowhead filled white in place of the original drawn stroke. After the arrow logic is deemed to be valid for both its source(s) and target object(s), then the arrowhead of the drawn and recognized arrow will turn white. This lets a user decide if they wish to complete the implementation of the arrow logic for the currently designated source object(s) and target object(s).

Step 216. The user has clicked on the white-filled arrowhead of an Actionable rendered arrow. The user places their mouse cursor over the white arrowhead of the drawn and recognized arrow and then performs a mouse downclick.

Step 217. Perform using $ACTION_x$ on source objects "SOURCEOBJECTLIST" with target "TARGETOBJECT" if any. After receiving a mouse downclick on the white arrowhead, the software performs the action of the arrow logic on the source object(s) and the target object(s) as defined by the arrow logic.

Step 218. Remove the rendered arrow from the display. After the arrow logic is performed under step 217, the arrow is removed from being onscreen and no longer appears on the global drawing surface. This removal is not graphical only. The arrow is removed and no longer exists in time. However, the result of its action being performed on its source and target object(s) remains.

Figure 16:
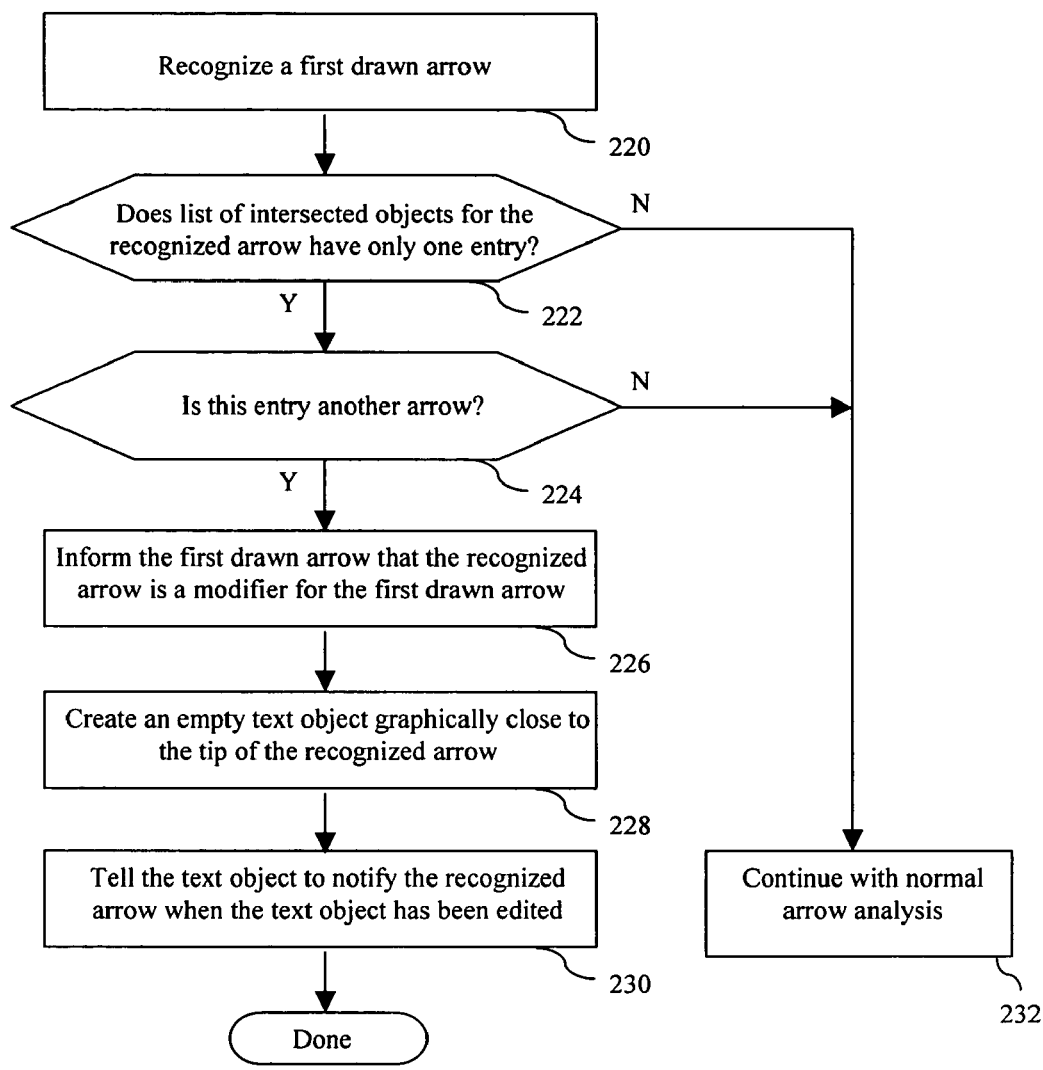
FIG. 16 is a flowchart of a process for recognizing a modifier arrow in accordance with an embodiment of the invention.
Figure 17:
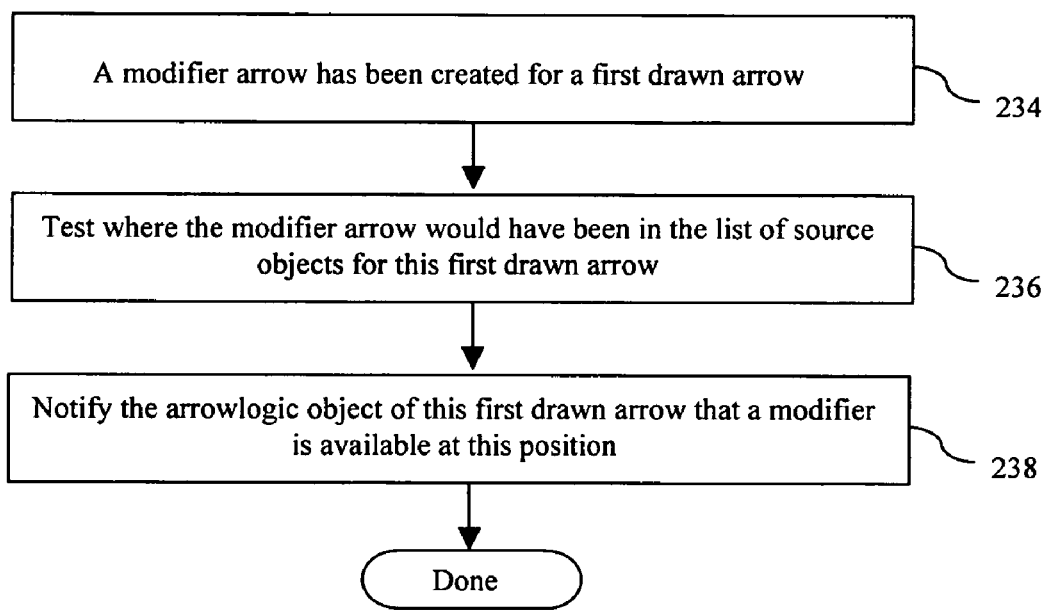
FIG. 17 is a flowchart of a process for accepting a modifier arrow by an arrow in accordance with an embodiment of the invention.
Figure 18:
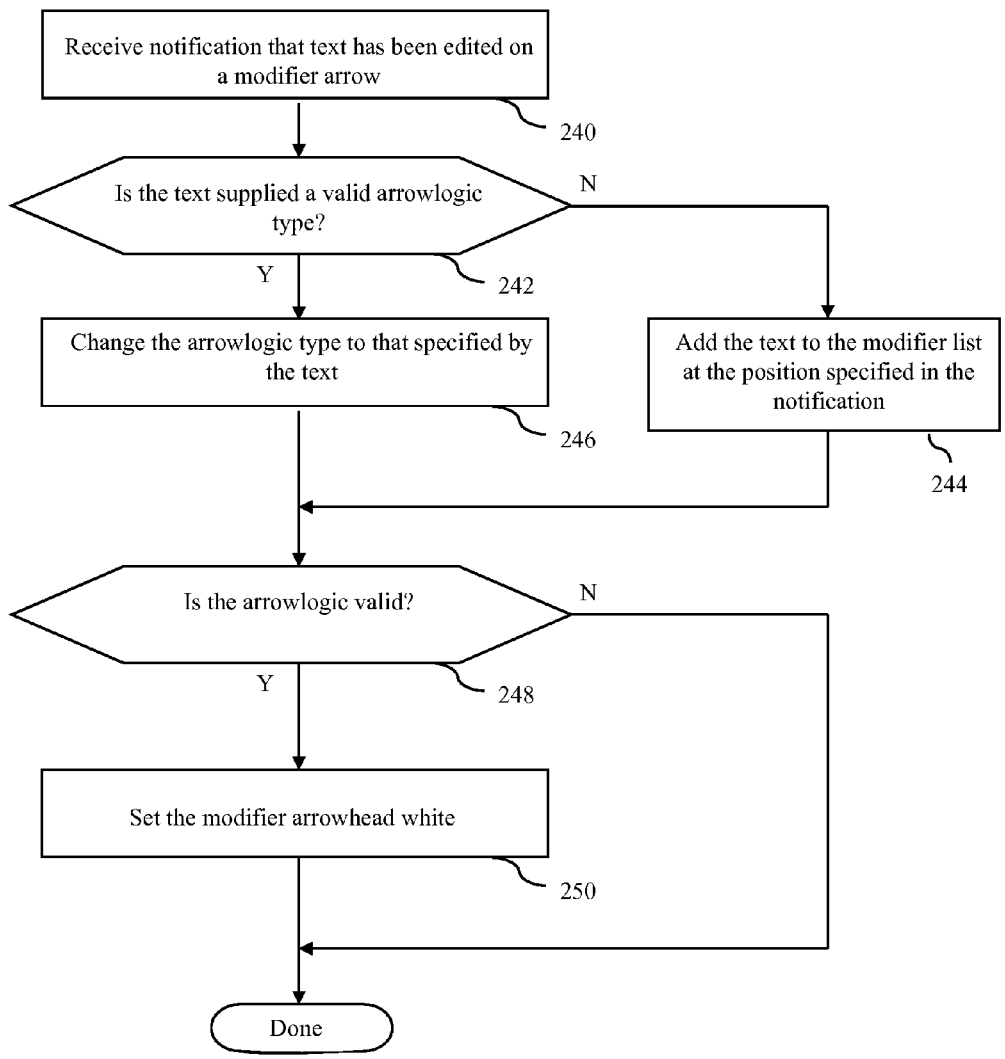
FIG. 18 is a flowchart of a process for accepting modifier text by an arrowlogic object in accordance with an embodiment of the invention.

Turning now to FIGS. 16, 17 and 18, processes related to a modifier arrow are now described. The process for recognizing a modifier arrow in accordance with an embodiment of the invention is described with reference to a flowchart of FIG. 16. At block 220, a first drawn arrow is recognized as an arrow. Next, at block 222, a determination is made whether the list of "intersected" objects (source objects) for the recognized arrow has only one entry. If no, the process proceeds to block 232, where normal arrow analysis is performed. If yes, then the process proceeds to block 224, where a determination is made whether this entry is another arrow. If no, then the process proceeds to block 232. If yes, then the process proceeds to block 226, where the first drawn arrow is informed that this recognized arrow is a modifier for the first drawn arrow.

Next, at block 228, an empty text object is created graphically close to the tip of the recognized arrow. This can be a text cursor that enables a user to type characters that will be used to define the behavior and/or properties of the modifier arrow. Next, at block 230, the text object is told to notify the recognized arrow when the text object has been edited. In other words, when the user utilizes this text cursor to enter characters to define the modifier arrow's action, behavior, etc. The process then comes to an end.

The process for accepting a modifier arrow by an arrow in accordance with an embodiment of the invention is now described with reference to a flowchart of FIG. 17. At block 234, a modifier arrow has been created for a first drawn arrow(s). Next, at block 236, a test is performed where the modifier arrow would have been in the list of source objects for this first drawn arrow. Next, at block 238, the arrowlogic object of this first drawn arrow is notified that a modifier is available at a position where the modifier arrow has intersected this first drawn arrow.

The process for accepting modifier text by an arrowlogic object in accordance with an embodiment of the invention is now described with reference to a flowchart of FIG. 18. At block 240, a notification that text has been edited on a modifier arrow is received. Next, at block 242, a determination is made whether the text supplied is a valid arrowlogic type. That is, text has been recognized from a list of predefined arrowlogic names. If no, then the process proceeds to block 244, where the text is added to the modifier list at the position specified in the notification. The process then proceeds to block 248. If the text supplied is a valid arrowlogic type, then the arrowlogic type is changed to that specified by the text, at block 246. The process then proceeds block 248.

At block 248, a determination is made whether the arrowlogic is valid. The arrowlogic being referred to here is the arrow logic of the first drawn arrow, as it has been modified by the modifier arrow and its modifier text—the characters typed for that modifier arrow. In other words, is the original arrowlogic still valid after being modified by the modifier arrow. If no, then the process comes to an end. If yes, then the modifier arrowhead is set to white.

Figure 19:
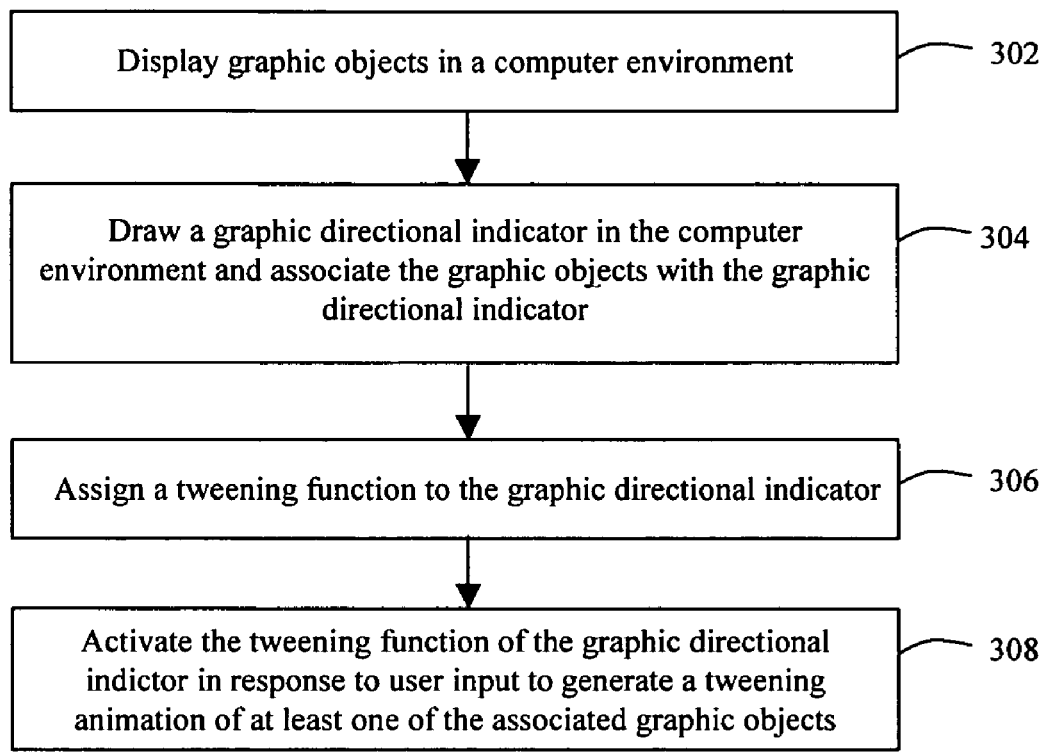
FIG. 19 is a process flow diagram of a method for creating and playing tweening animations in accordance with an embodiment of the invention.

A method for creating and playing tweening animations in accordance with an embodiment of the invention is described with reference to a flow diagram of FIG. 19. At block 302, graphic objects in a computer environment, e.g., a Blackspace environment, are displayed. Next, at block 304, a graphic directional indicator is drawn in the computer environment. Furthermore, at block 304, the graphic objects are associated with the graphic directional indicator by, for example, drawing the graphic directional indicator that intersects, nearly intersects and/or substantially encircle the graphic objects. Next, at block 306, a tweening function is created to modify the arrow logic of the graphic directional indicator. Next, at block 308, the tweening function of the graphic directional indictor is activated in response to user input to generate a tweening animation of at least one of the source objects for the graphic directional indicator.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for creating and playing tweening animations, said method comprising:
    displaying graphic objects in a computer environment;
    drawing a first graphic directional indicator in said computer environment, including associating said graphic objects with said first graphic directional indicator;
    determining whether a particular logic is valid for said first graphic directional indicator, said particular logic being related to a computer operation that can be performed in said computer operating environment;
    drawing a second graphic directional indicator in said computer environment, including associating said first graphic directional indicator with said second graphic directional indicator;
    assigning a tweening logic to said first graphic directional indicator in response to a user-entered command for said second graphic directional indicator such that said particular logic for said first graphic directional indicator is changed to a different logic of said tweening logic;
    modifying a parameter of said tweening logic in response to a user modification of said tweening logic using a modifier of said tweening logic; and
    activating said tweening logic of said first graphic directional indictor in response to user input to generate a tweening animation of at least one of said graphic objects.

2. The method of claim 1 wherein said drawing said first graphic directional indicator includes drawing an arrow in said computer environment.

3. The method of claim 2 wherein said drawing said first graphic directional indicator includes drawing said arrow of a particular color.

4. The method of claim 2 wherein said drawing said first graphic directional indicator includes drawing said arrow that intersects, nearly intersects or substantially encircles one or more of said graphic objects to associate said graphic objects with said arrow.

5. The method of claim 1 further comprising setting a particular graphic object of said graphic objects to be used as a path for said tweening animation in response to user input, and playing said tweening animation in which said particular graphic object is used as said path for said tweening animation.

6. The method of claim 1 wherein said associating said graphic objects includes associating a user-manipulable control device with said first graphic directional indicator, and further comprising automatically changing a property of said user-manipulable control device from a tween object to a control device for said tweening animation based on context of said user-manipulable control device and said first and second graphic directional indicators.

7. The method of claim 1 wherein said activating includes automatically playing said tweening animation.

8. The method of claim 1 wherein said activating includes generating a path to be used in said tweening animation using selected points of said graphic objects.

9. The method of claim 1 wherein said modifying said parameter of said tweening logic includes modifying said parameter of said tweening logic in response to a user-drawn graphic directional indicator for said second graphic directional indicator and user-entered alphanumeric characters near said user-drawn graphic directional indicator.

10. The method of claim 1 wherein said modifying said parameter of said tweening logic includes modifying said parameter of said tweening logic in response to user-entered alphanumeric characters dragged and dropped on or near said second graphic directional indicator.

11. The method of claim 1 wherein said modifying said parameter of said tweening logic includes modifying said parameter of said tweening logic in response to user-entered alphanumeric characters dragged and dropped on or near one of said graphic objects.

12. The method of claim 1 further comprising displaying a linear timeline for said tweening animation, said linear timeline including playbars corresponding to said graphic objects that are tweenable, wherein the length of each playbar represents a duration of time in said tweening animation that a graphic object for that playbar is displayed.

13. The method of claim 12 wherein said modifying includes modifying said tweening logic such that said second graphic object is used as a path for said tweeening animation.

14. The method of claim 12 wherein said modifying includes modifying said tweening logic such that said second graphic object is a control device for said tweeening animation.

15. A storage medium readable by a computer, tangibly embodying a program of instructions executable by said computer to perform method steps for creating and playing tweening animation, said method steps comprising:
    displaying graphic objects in a computer environment;
    drawing a first graphic directional indicator in said computer environment, including associating said graphic objects with said first graphic directional indicator;
    determining whether a particular logic is valid for said first graphic directional indicator, said particular logic being related to a computer operation that can be performed in said computer operating environment;
    drawing a second graphic directional indicator in said computer environment, including associating said first graphic directional indicator with said second graphic directional indicator;
    assigning a tweening logic to said first graphic directional indicator in response to a user-entered command for said second graphic directional indicator such that said particular logic for said first graphic directional indicator is changed to a different logic of said tweening function;
    modifying a parameter of said tweening logic in response to a user modification of said tweening logic using a modifier of said tweening logic; and
    activating said tweening logic of said first graphic directional indictor in response to user input to generate a tweening animation of at least one of said graphic objects.

16. The storage medium of claim 15 wherein said drawing said first graphic directional indicator includes drawing an arrow in said computer environment.

17. The storage medium of claim of claim 16 wherein said drawing said first graphic directional indicator includes drawing said arrow of a particular color.

18. The storage medium of claim 1 wherein said drawing said first graphic directional indicator includes drawing said arrow that intersects, nearly intersects or substantially encircles one or more of said graphic objects to associate said graphic objects with said arrow.

19. The storage medium of claim 15 wherein said method steps further comprises setting a particular graphic object of said graphic objects to be used as a path for said tweening animation in response to user input, and playing said tweening animation in which said particular graphic object is used as said path for said tweening animation.

20. The storage medium of claim 15 wherein said associating said graphic objects includes associating a user-manipulable control device with said first graphic directional indicator, and further comprising automatically changing a property of said user-manipulable control device from a tween object to a control device for said tweening animation based on context of said user-manipulable control device and said first and second graphic directional indicators.

21. The storage medium of claim 15 wherein said activating includes automatically playing said tweening animation.

22. The storage medium of claim 15 wherein said activating includes generating a path to be used in said tweening animation using selected points of said graphic objects.

23. A method for creating and playing tweening animations, said method comprising:
displaying at least a first graphic object and a second graphic object in a computer environment;
drawing a first graphic directional indicator in said computer environment, including associating said first and second graphic objects with said first graphic directional indicator as source objects for said first graphic directional indicator;
determining whether a particular logic is valid for said first graphic directional indicator, said particular logic being related to a computer operation that can be performed in said computer operating environment;
drawing a second graphic directional indicator in said computer environment, including associating said first graphic directional indicator with said second graphic directional indicator;
assigning a tweening logic to said first graphic directional indicator in response to a user-entered command for said second graphic directional indicator such that said particular logic for said first graphic directional indicator is changed to a different logic of said tweening logic;
modifying a property of said second graphic object such that said second graphic object is changed from being one of said source objects to a modifier for said tweening logic; and
activating said tweening logic of said first graphic directional indictor in response to user input to generate a tweening animation that includes at least said first graphic object and defined by said modifier.

24. A method for creating and executing a user-defined computer operation, said method comprising:
displaying at least a first graphic object and a second graphic object in a computer environment;
drawing a first graphic directional indicator in said computer environment, including associating said first and second graphic objects with said first graphic directional indicator as source objects for said firs graphic directional indicator;
determining whether a particular logic is valid for said first graphic directional indicator, said particular logic being related to a computer operation that can be performed in said computer operating environment;
drawing a second graphic directional indicator in said computer environment, including associating said first graphic directional indicator with said second graphic directional indicator;
assigning a new logic to said first graphic directional indicator in response to a user-entered command for said second graphic directional indicator such that said particular logic for said first graphic directional indicator is changed to said new logic;
modifying a property of said second graphic object such that said second graphic object is changed from being one of said source objects to a modifier for said new logic; and
activating said new logic of said first graphic directional indictor in response to user input to execute said user-defined computer operation defined by said new logic and said modifier.

* * * * *